(12) United States Patent  
Beymore et al.

(10) Patent No.: US 10,613,727 B2  
(45) Date of Patent: Apr. 7, 2020

(54) COLOR AND TEXTURE MATCH RATINGS FOR OPTIMAL MATCH SELECTION

(71) Applicant: PPG Industries Ohio, Inc., Cleveland, OH (US)

(72) Inventors: Paul Beymore, Vermilion, OH (US); Penny Neisen, Cleveland Heights, OH (US); Mary Kimbro, Strongsville, OH (US); James Pereksta, Rocky River, OH (US); Thomas Pondelik, Winchester, VA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 442 days.

(21) Appl. No.: 15/047,950

(22) Filed: Feb. 19, 2016

(65) Prior Publication Data

US 2017/0242570 A1     Aug. 24, 2017

(51) Int. Cl.
*G06F 3/0484*   (2013.01)
*G06F 3/0481*   (2013.01)
(Continued)

(52) U.S. Cl.
CPC .......... *G06F 3/04847* (2013.01); *G01J 3/463* (2013.01); *G01J 3/504* (2013.01); *G06F 3/04817* (2013.01)

(58) Field of Classification Search
CPC .. G06F 3/04847; G06F 3/04817; B05B 15/00
See application file for complete search history.

(56) References Cited

U.S. PATENT DOCUMENTS 3,751,282 A   8/1973  Massa
4,344,142 A   8/1982  Diehr, II
(Continued)

FOREIGN PATENT DOCUMENTS

AU   2009308956 B2   5/2010
CA      2522414 A1   11/2004
(Continued)

OTHER PUBLICATIONS

Anonymous, "Chapter 1.3.5.17. Detection of Outliers", NIST/SEMATECH e-Handbook of Statistical Methods, Jan. 1, 2012, XP055162021.
(Continued)

*Primary Examiner* — Shourjo Dasgupta
(74) *Attorney, Agent, or Firm* — W. Brad Barger

(57) ABSTRACT

A computerized method for displaying matches of a paint sample to various proposed paint coatings includes receiving one or more coating texture variables of a target coating from a coating-measurement instrument. The method also includes displaying, on a digital display device, effect texture ratings for multiple respective proposed coating matches on a digital display device, wherein the effect texture ratings indicate a similarity between the one or more coating texture variables of the target coating and respective coating textures variables of each of the respective proposed coating matches. In addition, the method includes ordering the proposed coating matches, wherein the ordering indicates a strength in similarity between the target coating and each of the proposed coating matches with respect to the effect texture ratings.

20 Claims, 9 Drawing Sheets

(51) Int. Cl.
*G01J 3/50* (2006.01)
*G01J 3/46* (2006.01)

(56) References Cited

U.S. PATENT DOCUMENTS

| | | |
|---|---|---|
| 4,479,718 A | 10/1984 | Alman |
| 4,692,481 A | 9/1987 | Kelly |
| 4,711,580 A | 12/1987 | Venable |
| 2,117,101 A | 5/1992 | Moore et al. |
| 5,153,825 A | 10/1992 | Yauk et al. |
| 5,217,377 A | 6/1993 | Little, Jr. |
| 5,217,744 A | 6/1993 | Little, Jr. |
| 5,231,472 A | 7/1993 | Marcus |
| 5,319,437 A | 6/1994 | Van Aken |
| 5,583,642 A | 12/1996 | Nakazono |
| 5,590,251 A | 12/1996 | Takagi |
| 5,612,928 A | 3/1997 | Haley |
| 5,798,943 A | 8/1998 | Cook |
| 5,926,262 A | 7/1999 | Jung |
| 5,929,998 A | 7/1999 | Kettler |
| 6,166,814 A | 12/2000 | Pringle |
| 6,210,159 B1 | 4/2001 | Lehmann et al. |
| 6,249,751 B1 | 6/2001 | Asaba et al. |
| 6,343,264 B1 | 1/2002 | Fenton |
| 6,358,047 B2 | 3/2002 | Lehmann |
| 6,449,384 B2 | 9/2002 | Di Venuto |
| 6,507,824 B1 | 1/2003 | Yon |
| 6,539,325 B1 | 3/2003 | Numata |
| 6,714,924 B1 | 3/2004 | McClanahan |
| 6,717,673 B1 | 4/2004 | Janssen et al. |
| 6,750,970 B2 | 6/2004 | Masuda |
| 6,760,483 B1 | 7/2004 | Elichai et al. |
| 6,774,903 B1 | 8/2004 | Glen |
| 6,786,726 B2 | 9/2004 | Lehmann et al. |
| 6,794,669 B2 | 9/2004 | Chelvayohan et al. |
| 6,870,614 B2 | 3/2005 | Graf et al. |
| 6,901,379 B1 | 5/2005 | Balter |
| 6,914,613 B2 | 7/2005 | Marchand |
| 6,924,817 B2 | 8/2005 | Rice |
| 6,926,407 B2 | 8/2005 | Simpson |
| 6,928,454 B2 | 8/2005 | Menner |
| 6,940,597 B2 | 9/2005 | Taylor et al. |
| 7,030,986 B2 | 4/2006 | Overbeck et al. |
| 7,035,464 B2 | 4/2006 | Masuda |
| 7,050,168 B2 | 5/2006 | Overbeck et al. |
| 7,062,722 B1 | 6/2006 | Carlin |
| 7,071,909 B2 | 7/2006 | Willis et al. |
| 7,106,363 B2 | 9/2006 | Hickman |
| 7,145,656 B2 | 12/2006 | Rodrigues et al. |
| 7,167,246 B1 | 1/2007 | Skierski |
| 7,187,386 B2 | 3/2007 | Rice |
| 7,193,632 B2 | 3/2007 | Rice |
| 7,230,629 B2 | 6/2007 | Reynolds |
| 7,283,244 B2 | 10/2007 | Takagi |
| 7,330,585 B2 | 2/2008 | Rice |
| 7,375,335 B2 | 5/2008 | Vogel et al. |
| 7,466,415 B2 | 12/2008 | Gibson et al. |
| 7,509,271 B2 | 3/2009 | Uchimi |
| 7,536,231 B2 | 5/2009 | McClanahan |
| 7,605,824 B2 | 10/2009 | Reynolds |
| 7,639,255 B2 | 12/2009 | Steenhoek et al. |
| 7,737,991 B2 | 6/2010 | McClanahan |
| 7,743,055 B2 | 6/2010 | Rodrigues et al. |
| 7,747,615 B2 | 6/2010 | Rodrigues et al. |
| 7,804,597 B2 | 9/2010 | De Haas et al. |
| 7,809,155 B2 | 10/2010 | Nestares |
| 7,815,435 B2 | 10/2010 | Riley |
| 7,827,163 B2 | 11/2010 | Masuda et al. |
| 7,865,041 B1 | 1/2011 | Ma et al. |
| 7,909,241 B2 | 3/2011 | Stone |
| 7,944,561 B2 | 5/2011 | Nisper et al. |
| 7,953,274 B2 | 5/2011 | Sara |
| 7,999,825 B2 | 8/2011 | Webb |
| 8,065,314 B2 * | 11/2011 | Prakash ............... G01J 3/46 345/589 |
| D657,267 S | 4/2012 | Meijer |
| 8,290,253 B1 | 10/2012 | Wang et al. |
| 8,345,252 B2 | 1/2013 | Nisper et al. |
| 8,407,014 B2 | 3/2013 | Prakash et al. |
| 8,606,731 B2 | 12/2013 | Fujieda et al. |
| 8,743,364 B2 | 6/2014 | Krause et al. |
| 8,824,640 B1 | 9/2014 | Winsor et al. |
| 8,867,043 B2 | 10/2014 | Schwarz et al. |
| 8,879,066 B2 | 11/2014 | Norris |
| 8,929,646 B2 | 1/2015 | Rodrigues et al. |
| 9,080,915 B2 | 7/2015 | Krause et al. |
| 10,178,351 B2 | 1/2019 | Beymore et al. |
| 2002/0002497 A1 | 1/2002 | Tilman |
| 2002/0106121 A1 | 8/2002 | McClanahan |
| 2002/0126075 A1 | 9/2002 | Willis |
| 2002/0126079 A1 | 9/2002 | Willis et al. |
| 2002/0126134 A1 | 9/2002 | Willis et al. |
| 2002/0184232 A1 | 12/2002 | Menner |
| 2003/0048942 A1 | 3/2003 | Masuda |
| 2003/0055737 A1 | 3/2003 | Ope et al. |
| 2003/0193669 A1 | 10/2003 | Takagi |
| 2003/0197710 A1 | 10/2003 | Gonsalves et al. |
| 2003/0208345 A1 | 11/2003 | O'Neill |
| 2003/0216972 A1 | 11/2003 | Gotou |
| 2003/0223060 A1 | 12/2003 | Graf et al. |
| 2004/0001203 A1 | 1/2004 | Simpson |
| 2004/0032588 A1 | 2/2004 | Taylor et al. |
| 2004/0046802 A1 | 3/2004 | Wright |
| 2004/0068417 A1 | 4/2004 | Sevdermish |
| 2004/0073526 A1 | 4/2004 | McClanahan |
| 2004/0158505 A1 | 8/2004 | Kurus |
| 2004/0218182 A1 | 11/2004 | Alman et al. |
| 2005/0090919 A1 | 4/2005 | Pogue |
| 2005/0128484 A1 | 6/2005 | Rodrigues et al. |
| 2005/0157926 A1 | 7/2005 | Moravec |
| 2005/0169518 A1 | 8/2005 | Boston et al. |
| 2005/0281480 A1 | 12/2005 | Baldwin |
| 2006/0001677 A1 | 1/2006 | Webb |
| 2006/0030060 A1 | 2/2006 | Noguchi et al. |
| 2006/0181707 A1 | 8/2006 | Gibson |
| 2006/0195369 A1 | 8/2006 | Webb |
| 2006/0232802 A1 | 10/2006 | Gray |
| 2006/0245632 A1 | 11/2006 | Nisper et al. |
| 2007/0019887 A1 | 1/2007 | Nestares |
| 2007/0097119 A1 | 5/2007 | Steenhoek et al. |
| 2007/0172113 A1 | 7/2007 | Sai et al. |
| 2007/0200337 A1 | 8/2007 | Johnson et al. |
| 2007/0226158 A1 | 9/2007 | Woronow |
| 2007/0250273 A1 | 10/2007 | De Haas et al. |
| 2008/0056563 A1 | 3/2008 | Schiller et al. |
| 2008/0162157 A1 | 7/2008 | Daniluk |
| 2008/0177586 A1 | 7/2008 | Jamjoom |
| 2008/0228599 A1 | 9/2008 | Webb |
| 2008/0235224 A1 * | 9/2008 | Joseph Rodrigues ............... G06F 17/30274 |
| 2008/0255976 A1 | 10/2008 | Alterberg |
| 2008/0278723 A1 | 11/2008 | Marchak |
| 2008/0284791 A1 | 11/2008 | Bressan et al. |
| 2009/0015835 A1 | 1/2009 | Balakrishnan et al. |
| 2009/0019086 A1 | 1/2009 | Prakash et al. |
| 2009/0157212 A1 * | 6/2009 | McClanahan ............ G01J 3/46 700/107 |
| 2009/0183122 A1 | 7/2009 | Webb |
| 2009/0213120 A1 | 8/2009 | Nisper et al. |
| 2009/0240363 A1 * | 9/2009 | Hughes ............... G05D 11/139 700/97 |
| 2009/0274827 A1 * | 11/2009 | Anderson ............. G06Q 10/06 427/8 |
| 2009/0292520 A1 | 11/2009 | Nwankpa |
| 2009/0324068 A1 | 12/2009 | Yamakawa |
| 2010/0048242 A1 | 2/2010 | Rhoads |
| 2010/0067786 A1 | 3/2010 | Willensky et al. |
| 2010/0169255 A1 | 7/2010 | Fujieda et al. |
| 2010/0228511 A1 | 9/2010 | Chin et al. |
| 2010/0262551 A1 | 10/2010 | Caruso |
| 2011/0013176 A1 | 1/2011 | Schwarz et al. |
| 2011/0052058 A1 | 3/2011 | Ma et al. |
| 2011/0085169 A1 | 4/2011 | Craighead et al. |
| 2011/0237683 A1 | 9/2011 | Schmid et al. |

(56) References Cited

U.S. PATENT DOCUMENTS

| | | | |
|---|---|---|---|
| 2011/0246087 A1 | 10/2011 | Prakash et al. | |
| 2011/0282613 A1 | 11/2011 | Skinner | |
| 2011/0299099 A1 | 12/2011 | Xu et al. | |
| 2012/0098845 A1* | 4/2012 | Kirchner | G01J 3/46 345/582 |
| 2012/0188544 A1 | 7/2012 | Friery et al. | |
| 2012/0206479 A1 | 8/2012 | Bryant et al. | |
| 2012/0225190 A1 | 9/2012 | Steenhoek et al. | |
| 2012/0236309 A1 | 9/2012 | Krause et al. | |
| 2012/0243797 A1 | 9/2012 | Di Venuto | |
| 2013/0071015 A1 | 3/2013 | Rodrigues et al. | |
| 2013/0083991 A1 | 4/2013 | Rodrigues et al. | |
| 2013/0127689 A1 | 5/2013 | Gollier | |
| 2013/0215143 A1 | 8/2013 | Pettigrew | |
| 2013/0244197 A1 | 9/2013 | Tijoe | |
| 2013/0300761 A1 | 11/2013 | Ahmed | |
| 2014/0078293 A1 | 3/2014 | Beymore et al. | |
| 2014/0195468 A1 | 7/2014 | Mohammadi et al. | |
| 2014/0239234 A1 | 8/2014 | Krause et al. | |
| 2014/0242271 A1* | 8/2014 | Prakash | B60S 5/00 427/140 |
| 2014/0244558 A1 | 8/2014 | Mohammadi et al. | |
| 2014/0250109 A1 | 9/2014 | Wang | |
| 2014/0253610 A1 | 9/2014 | Alman et al. | |
| 2014/0278253 A1 | 9/2014 | Beymore | |
| 2014/0278254 A1 | 9/2014 | Beymore | |
| 2015/0023054 A1 | 1/2015 | Goda | |
| 2015/0026298 A1 | 1/2015 | Kirchner et al. | |
| 2015/0032430 A1 | 1/2015 | Rump et al. | |
| 2015/0134269 A1 | 5/2015 | Norris | |
| 2015/0134299 A1 | 5/2015 | Norris | |
| 2015/0134300 A1 | 5/2015 | Norris | |
| 2015/0160122 A1 | 6/2015 | Moy et al. | |
| 2015/0160123 A1 | 6/2015 | Moy et al. | |
| 2015/0228002 A1* | 8/2015 | Berger | G06Q 30/0627 705/26.63 |

FOREIGN PATENT DOCUMENTS

| | | |
|---|---|---|
| CA | 2607324 A1 | 11/2006 |
| CA | 2665161 A1 | 4/2008 |
| CA | 2852563 A1 | 5/2013 |
| CN | 1635957 | 7/2005 |
| CN | 1784592 | 6/2006 |
| CN | 1797420 | 7/2006 |
| CN | 101023332 | 8/2007 |
| CN | 101180523 A | 5/2008 |
| CN | 101523172 A | 9/2009 |
| CN | 101730835 | 6/2010 |
| CN | 101784871 | 7/2010 |
| CN | 102047086 A | 5/2011 |
| CN | 102414722 A | 4/2012 |
| CN | 102449644 | 5/2012 |
| CN | 102549545 | 7/2012 |
| CN | 102667444 | 9/2012 |
| CN | 104114985 A | 10/2014 |
| CN | 104137049 A | 11/2014 |
| CN | 104346420 A | 2/2015 |
| CN | 104769419 A | 7/2015 |
| CN | 105051762 A | 11/2015 |
| DE | 102007000980 A1 | 5/2009 |
| DE | 112012004460 T5 | 7/2014 |
| EP | 0828144 | 3/1998 |
| EP | 1359399 A2 | 11/2003 |
| EP | 1789763 B1 | 8/2009 |
| EP | 2199350 A1 | 6/2010 |
| EP | 1695293 B1 | 8/2010 |
| EP | 2721542 | 12/2012 |
| EP | 2761517 | 4/2013 |
| EP | 2833327 A2 | 2/2015 |
| EP | 2898313 A1 | 7/2015 |
| EP | 2161555 A1 | 6/2018 |
| JP | 2002236850 | 8/2002 |
| JP | 2003-294530 A | 10/2003 |
| JP | 58076741 | 3/2005 |
| JP | 2005528603 A | 9/2005 |
| JP | 2007505202 | 3/2007 |
| JP | 2007218895 | 8/2007 |
| JP | 2007218895 | 9/2007 |
| JP | 2010-508134 A | 3/2010 |
| JP | 2012-515950 A | 7/2012 |
| JP | 2012173272 | 9/2012 |
| JP | 2013536060 A | 9/2013 |
| JP | 2015-529832 A | 10/2015 |
| KR | 100220769 A2 | 6/1999 |
| KR | 20010078213 | 8/2001 |
| KR | 10-20070053295 A | 5/2007 |
| KR | 10-20080006642 A | 1/2008 |
| KR | 20100102147 | 9/2010 |
| KR | 10-20110018388 A | 2/2011 |
| TW | 200608310 | 3/2006 |
| TW | 200821602 | 5/2008 |
| TW | 200834273 | 8/2008 |
| TW | 201339652 | 10/2013 |
| WO | 2001/25737 A1 | 4/2001 |
| WO | 02/063556 A2 | 8/2002 |
| WO | 02/063557 A2 | 8/2002 |
| WO | 2003063719 | 8/2003 |
| WO | 03/102521 A1 | 12/2003 |
| WO | 2004015380 A1 | 2/2004 |
| WO | 2004/099741 A1 | 11/2004 |
| WO | 20040101689 | 11/2004 |
| WO | 2005/059841 A1 | 6/2005 |
| WO | 2005124301 | 12/2005 |
| WO | 2006030028 | 3/2006 |
| WO | 2006078858 | 7/2006 |
| WO | 2006093689 | 9/2006 |
| WO | 2006096402 | 9/2006 |
| WO | 2006112864 | 10/2006 |
| WO | 2006/121776 A1 | 11/2006 |
| WO | 2007/021376 A1 | 2/2007 |
| WO | 2008/042393 A1 | 4/2008 |
| WO | 2008045418 | 4/2008 |
| WO | 2008/103405 A1 | 8/2008 |
| WO | 20080103405 | 8/2008 |
| WO | 2008/121358 A1 | 10/2008 |
| WO | 2007096402 | 1/2009 |
| WO | 2009/075728 A1 | 6/2009 |
| WO | 2009/144222 A1 | 12/2009 |
| WO | 2010/051294 A2 | 5/2010 |
| WO | 2010120873 | 10/2010 |
| WO | 2011/068600 | 6/2011 |
| WO | 2011/075212 A1 | 6/2011 |
| WO | 2011/163579 A1 | 12/2011 |
| WO | 2011/163583 A1 | 12/2011 |
| WO | 2012/065037 A1 | 5/2012 |
| WO | 2012/177508 A2 | 12/2012 |
| WO | 2013/049796 A1 | 4/2013 |
| WO | 2013049792 | 4/2013 |
| WO | 2013/063547 A1 | 5/2013 |
| WO | 2013/063552 A1 | 5/2013 |
| WO | 2013/081812 A1 | 6/2013 |
| WO | 2013/081903 A1 | 6/2013 |
| WO | 2013/092677 A1 | 6/2013 |
| WO | 2013/092678 A1 | 6/2013 |
| WO | 2013/092679 A1 | 6/2013 |
| WO | 2013/173400 A1 | 11/2013 |
| WO | 2013/173401 A1 | 11/2013 |
| WO | 2014/014555 A1 | 1/2014 |
| WO | 2014/121869 A1 | 8/2014 |
| WO | 2014/134099 A1 | 9/2014 |
| WO | 2014/135503 A1 | 9/2014 |
| WO | 2014150337 | 9/2014 |
| WO | 2015/107889 A1 | 7/2015 |
| WO | 2015/110687 A1 | 7/2015 |
| WO | 2017/143165 A1 | 8/2017 |

OTHER PUBLICATIONS

Paravina et al, "Evaluation of blending effect of composites related to restoration size", Dental Materials, Elsevier, Amsterdam, NL,

(56) References Cited

OTHER PUBLICATIONS vol. 22, No. 4, Apr. 1, 2006, pp. 299-307, XP027943381, ISSN: 0109-5641 table 2.
Takagi et al, "Prediction of spectral reflectance factor distribution of color-shift paint finishes", Color Research & Application, John Wiley & Sons, Inc., US, vol. 32, No. 5, Oct. 1, 2007, pp. 378-387, XP002604927, ISSN: 0361-2317.
"Kuncheva, Ludmila I., James C. Bezdek, and Robert PW Duin. "'Decision templates for multiple classifier fusion: an experimental comparison.'"Patternrecognition 34.2. 2001.".
I. Lissner, U. Philipp: "Upgrading Color-Difference Formulas", Journal of the Optical Society of America, vol. 27 No. 7, Jun. 11, 2010 (Jun. 11, 2010), pp. 1620-1629, XP055152562, DOI: 10,1364/JOSAA.27.001620 Sections 1 and 2.A.
D. Puig, M.A. Garcia, J. Melendez: "Application-Independent feature selection for texture classification", Pattern Recognition, vol. 43, No. 10, May 10, 2010 (May 10, 2010) pp. 3182-3297, XP027095420, DOI: 10. 1016/j.patcog.2010.05.005 abstract and section 3.
J.H. Xin, S. Shao, K.F.-L. Chung: "Colour-appearance modelling using feedforward networks with Bayesian regularization method-part 1: forward model", Color Research & Application, vol. 25, No. 6, Oct. 13, 2000, pp. 424-434, XP055152560, DOI: 10.1002/1520-6378(200012)25:6<424:"AID-COL7>3.0.CO;2-Q.
E. Kirchner: "Appearance and measurement modeling an drendering of the visual texture of automotive paints", Detroit Color Council, Mar. 13, 2013, XP055153196, Retreived from the Internet: URL: http://www.detroitcc.org/files/2013March14b.pdf, [retireved on Apr. 4, 2013] Models for predicting Texture.
E.J.J. Kirchner, J. Ravi: "Setting tolerances on color and texture for automotive coatings", Color Research & Application, vol. 39, No. 1, Jul. 25, 2012 pp. 88-98, XP055152561, DOI:10.1002/col.21767.
PPG Automotive Refinish: "RapidMatch™X-5:guida utente", Pittsburgh Plate Glass (PPG) Industries, 2013, XP055153237, retrieved from the Internet: URL:http://it.nexaautocolor.com/media/213903/rapidmatch_v1-2012_email_version.pdf [retrieved on Sep. 22, 2014].
Kokla, Vassiliki et al., A Bayesian decision model for watercolour analysis, Proc. of SPIE, 2007, vol. 6618, pp. 66180S-1-66180S-9.
Dekker et al., "Total Appearance Differences for Metallic and Pearlescent Materials: Contributions From Color and Texture", Color Research and Application, Feb. 2011, pp. 4 through 14, vol. 36, No. 1.
Huang et al., "Camera-based model to predict the total difference between effect coatings under directional illumination", Chinese Optics Letters, Sep. 10, 2011, pp. 093301-1 through 093301-5, Col. 9(9).
Exam Report dated Mar. 14, 2019 from Australian Patent Application No. 2017221464 filed Feb. 17, 2017.

International Preliminary Report on Patentability dated Aug. 21, 2018 from International Patent Application No. PCT/US2017/018497 filed Feb. 17, 2017.
International Search Report and Written Opinion dated Aug. 24, 2017 from International Patent Application No. PCT/US2017/018497 filed Feb. 17, 2017.
International Preliminary Report on Patentability dated Aug. 21, 2018 from International Patent Application No. PCT/US2017/018336 filed Feb. 17, 2017.
International Search Report and Written Opinion dated Aug. 24, 2018 from International Patent Application No. PCT/US2017/018336 filed Feb. 17, 2017.
Corrected Notice of Allowability dated Oct. 16, 2017 from U.S. Appl. No. 15/047,982, filed Feb. 19, 2016.
Notice of Allowance dated Jul. 11, 2017 from U.S. Appl. No. 15/047,982, filed Feb. 19, 2016.
Office Action dated Apr. 23, 2019 from Canadian Patent Application No. 3014915 filed Feb. 17, 2017.
Office Action dated Mar. 30, 2019 from Australian Patent Application No. 2017221431 filed Feb. 17, 2017.
Office Action dated Apr. 15, 2019 from Canadian Patent Application No. 3014901 filed Feb. 17, 2017.
Kitaguchi, Saori, et al., "Application of HDR Colour Imaging to Modeling of Glints in Metallic Coatings", Department of Colour Science, University of Leeds, School of Design, Technology Center Colorimetry, Association Internationale de la Couleur (AIC). Interim Meeting in Stockholm Jun. 15-18, 2008.
Kitaguchi, Saori, "Modelling Texture Appearance of Gonioapparent Objects", University of Leets Department of colour Science, Mar. 2008.
Office Action dated Sep. 17, 2019 from Australian Patent Application No. 2017221431.
Office Action dated Oct. 1, 2019 from Japanese Patent Application No. 2018543656.
Office Action dated Aug. 26, 2019 from Japanese Patent Application No. 2018543657.
Office Action dated Sep. 30, 2019 from Korean Patent Application No. 1020187023618.
Office Action dated Aug. 20, 2019 from Korean Patent Application No. 20187023632.
Office Action dated Oct. 18, 2019 from Japan Patent Application No. 2018543657.
Office Action dated Nov. 8, 2019 from Japan Patent Application No. 2018543656.
Office Action dated Dec. 10, 2019 from China Patent Application No. 201780011913.5.
Office Action for Chinese application No. 201780019914.X dated Dec. 12, 2019.

* cited by examiner

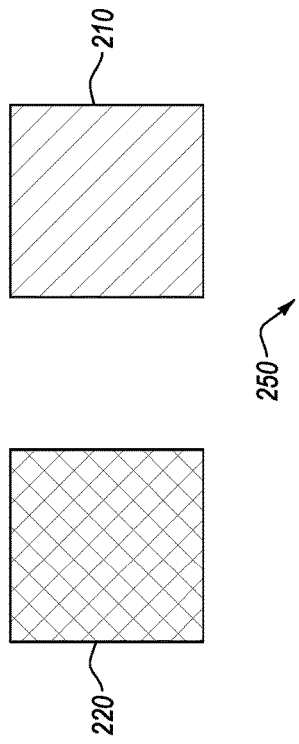

| | A Lot Less Than Target | A Little Less Than Target | Relatively Equal To Target | A Little More Than Target | A Lot More Than Target |
|---|---|---|---|---|---|
| Described As When You Consider, Coarseness, Sparkle Intensity, And Sparkle Density, How Would You Characterize The Overall Texture Of This Matched Pair | X | | | | |
| Described As Flake Size. How Would You Characterize The Overall Difference Of The Flake Size Of This Matched Pair | | | | X | |
| Described As Individual Flake Brightness How Would You Characterize the Overall Difference Flake Brightness Of This Matched Pair | | X | | | |
| Described As The Space Between Individual Flakes. How Would You Characterize The overall Difference Of The Distance Between Flakes Of This Matched Pair | | X | | | |

Proposed Match  
JV : Green  
Brand  Manufacturer  
123456  Acme www.website.com — 610

615

5 Potential Matches

| | MR | SC | ET | Compared To Target — 670 | Manufacturer — 680 | Color Description — 690 | Paint System — 695 |
|---|---|---|---|---|---|---|---|
| ☐ | ☐ | 2 | 98 | + OK | Acme | JV : Green : Prime | Metallic |
| ☐ | ☐ | 4 | 90 | + Face: Lighter | Acme | JV : Green : B | Metallic |
| ☐ | ☐ | 4 | 92 | + Face: Bluer | Paint Co. | JV : Green : LB (X7) | Metallic |
| ☐ | ☐ | 10 | 78 | + Flop: Yellower | Paint Co. | JV : Green : //D (X8) | Tri-Coat |
| ☐ | ☐ | 12 | 63 | + Flop: Redder, Yell... | Acme | JV : Green : D (X9) | Tri-Coat |

640 — 650 — 660

620
630
600

COLOR AND TEXTURE MATCH RATINGS FOR OPTIMAL MATCH SELECTION

BACKGROUND OF THE INVENTION

Coatings have been used for hundreds of years for protection and to add visual appeal to products and structures. For example, houses are painted or stained in order to protect the underlying siding from the weather and also to add aesthetic qualities to the house. Similarly, automobiles are painted, sometimes with multiple purpose-made layers, to protect the metal body of the vehicle and also to add visual appeal to the vehicle.

Various coatings may have specific features and properties that are beneficial or desirable for certain uses. For example, different coatings can have different electrical conductive properties, different chemical reactivity properties, different hardness properties, different UV properties, and other different use-specific properties. Additionally, coatings may comprise unique visual features. For example, some automotive coatings comprise texture features that give the coating unique visual effects.

The ability to provide highly consistent coating compositions is an important aspect in many different coating markets. For example, it is desirable for decorative coatings to comprise consistent colors and visual features. Similarly, the ability to match previously applied coatings to available coating colors is important. For example, when fixing a scratch in a car's coating, it is desirable to match both the color and the texture of the original coating. The ability to match coatings requires both consistent coating compositions and tools for correctly identifying the target coating and/or identifying an acceptable composition to match the target coating.

Significant technical difficulties exist in providing complex coating and texture information to end users. For example, coating information involves large numbers of distinct measurements from different angles. The resulting datasets can be large and difficult to use in practice. As such, there is a need for technically sound methods and schemes for processing large coating datasets and presenting the resulting information to end users in consistent terms that are easy to use and understand.

BRIEF SUMMARY OF THE INVENTION

The present invention comprises, among other things, computer-implemented methods, systems, and computer program products for providing, such as via a computerized display, easily understood, visible correlations between target coatings and proposed coating matches.

For example, the present invention comprises a method and corresponding computer program product for displaying matches of a paint sample to various proposed paint coatings. The method comprises receiving one or more coating texture variables of a target coating from a coating-measurement instrument. The method also comprises displaying, on a digital display device, effect texture ratings for multiple respective proposed coating matches on a digital display device. The effect texture ratings indicate a similarity between the one or more coating texture variables of the target coating and respective coating textures variables of each of the respective proposed coating matches. In addition, the method comprises ordering the proposed coating matches, wherein the ordering indicates a strength in similarity between the target coating and each of the proposed coating matches with respect to the effect texture ratings.

The present invention also comprises a method for displaying values that describe various attributes of one or more proposed, matching colors. The method comprises receiving from a coating-measurement instrument a plurality of coating variables of a target coating. The method also comprises receiving data for multiple respective proposed coating matches with the target coating, wherein the data comprise color data, texture data, and one or more sparkle color ratings. The multiple respective proposed coating matches are matched based at least in part on a match of sparkle color variables with the target coating. In addition, the method comprises displaying, in a user interface, the received sparkle color ratings of each proposed coating match. Furthermore, the method comprises displaying an overall ranking of each proposed coating match, wherein the overall ranking indicates a similarity of sparkle color ratings with the target coating and each proposed coating match.

In addition, the present invention comprises a method for displaying on a display device a graphical user interface that matches a target coating to another coating based on raw spectrophotometer data relevant to coating texture. The method comprises displaying an icon on a graphical user interface that indicates a color of a target coating, wherein the icon is selected by the computing system in response to raw spectrophotometric data taken for a target coating applied to a target object. The method also comprises displaying a number indicating an amount of potential matches of the target coating to predetermined coating information stored in a database, wherein the matches are based on a correlation of texture variables from the target coating and human-provided impression data. In addition, the method comprises, for each potential match displayed on the graphical user interface: displaying an icon that visually represents the potential match; displaying a visual depiction of a slider bar, wherein the slider bar indicates a relative texture difference between the target coating and the potential match; displaying at least one field that visually indicates a manufacturer associated with the target coating; displaying at least one field that visually indicates a color value for the potential match; and displaying at least one field that visually indicates a texture value for the potential match.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered in the following by reference to the appended drawings. Understanding that these drawings depict only exemplary or typical implementations of the invention and are not therefore to be considered to be limiting of its scope, the invention will be described and explained with additional specificity and detail through the use of the accompanying drawings in which:

FIG. 2C depicts yet another relative texture characteristic chart and accompanying example coatings in accordance with implementations of the present invention;

FIG. 6 depicts an exemplary coating texture information user interface in accordance with implementations of the present invention;

DETAILED DESCRIPTION

The present invention generally relates methods, systems, and computer program products for providing, such as via a computerized display, easily understood, visible correlations between target coatings and proposed coating matches made from complex, raw data, such as spectrophotometric data.

In particular, the present invention provides novel and innovative computerized methods for displaying matches of a target coating with a wide range of coating textures in a highly reliable way using human-understandable qualitative values (e.g., "coarseness," "sparkle," "intensity," etc.) Thus, in contrast to conventional methods of displaying coating matches with few or otherwise difficult to understand characteristics, the present invention can provide a wide range of simple and clear information that is understandable by a lay person. In particular, the present invention can provide a true visual match for an analyzed coating, whereby a target coating may be matched to reference data that is based upon visual impressions (typically human impressions) of a large cross-section of the general population. As such, the present invention can provide a simpler and more accurate means for identifying matches between target coatings and multiple other proposed matched coatings based at least in part on color sparkle, and other meaningful data.

Figure 1:
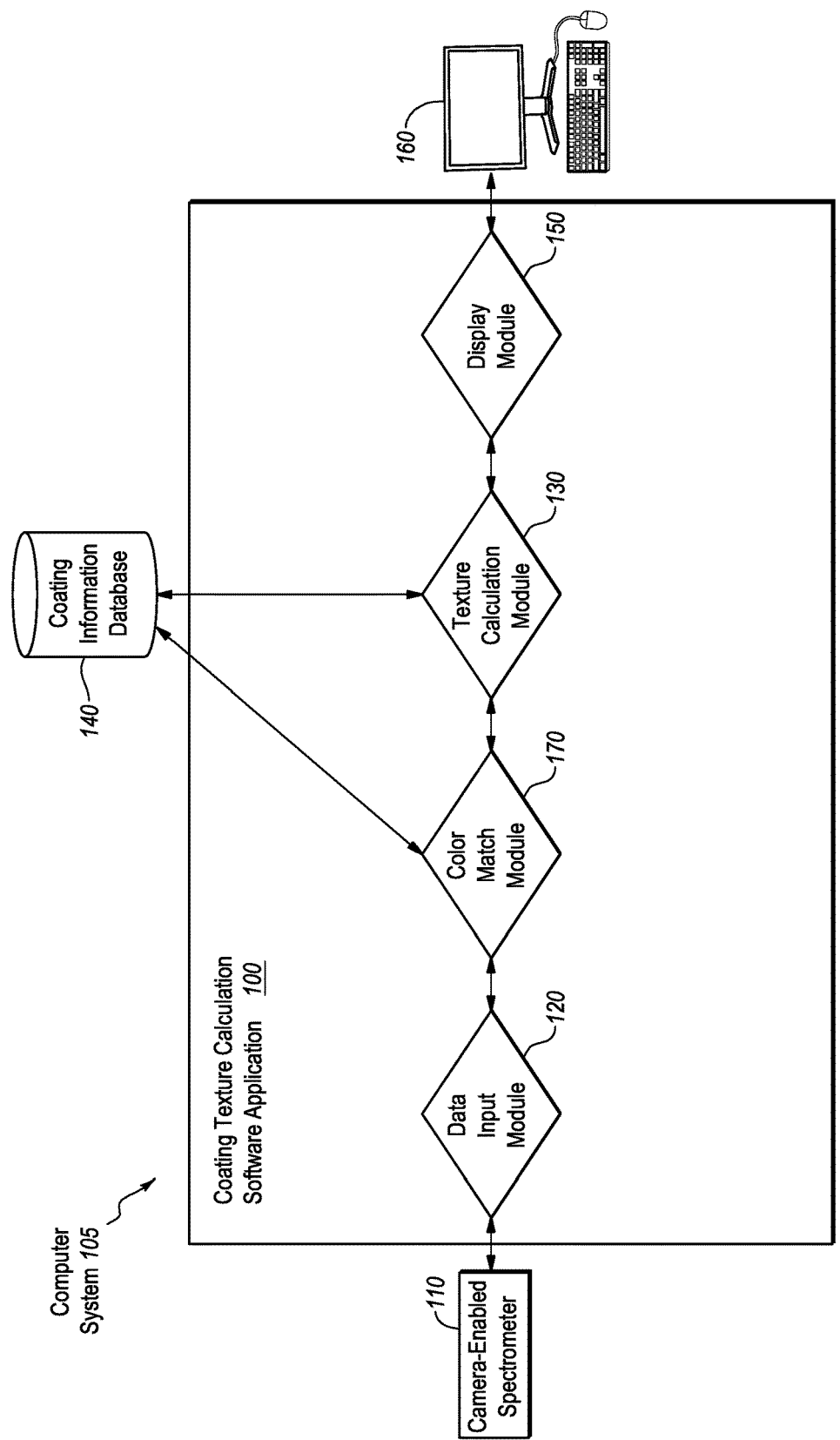
FIG. 1 depicts a schematic diagram of a system for calculating a coating texture in accordance with implementations of the present invention.
Figure 7:
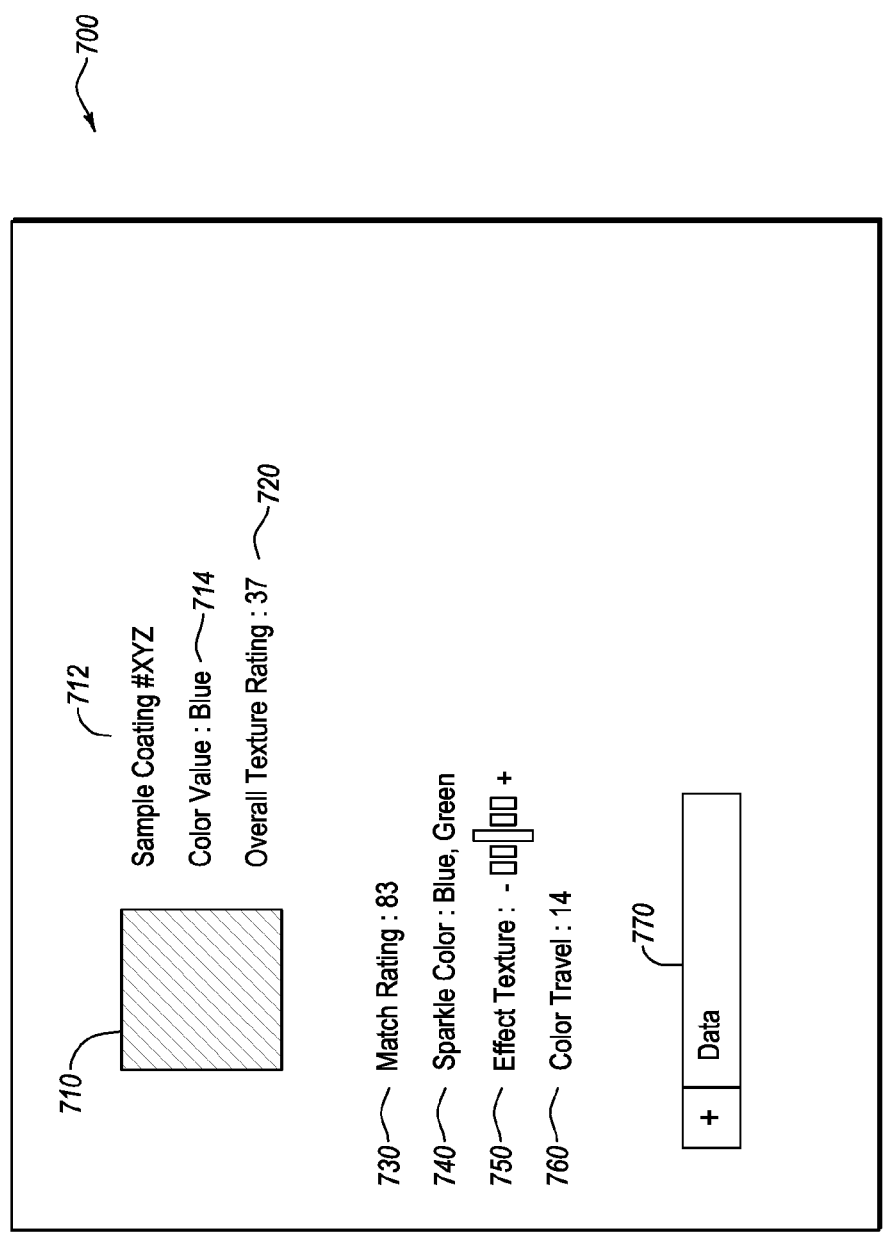
FIG. 7 depicts another exemplary coating texture information user interface 700 in accordance with implementations of the present invention.
Figure 8:
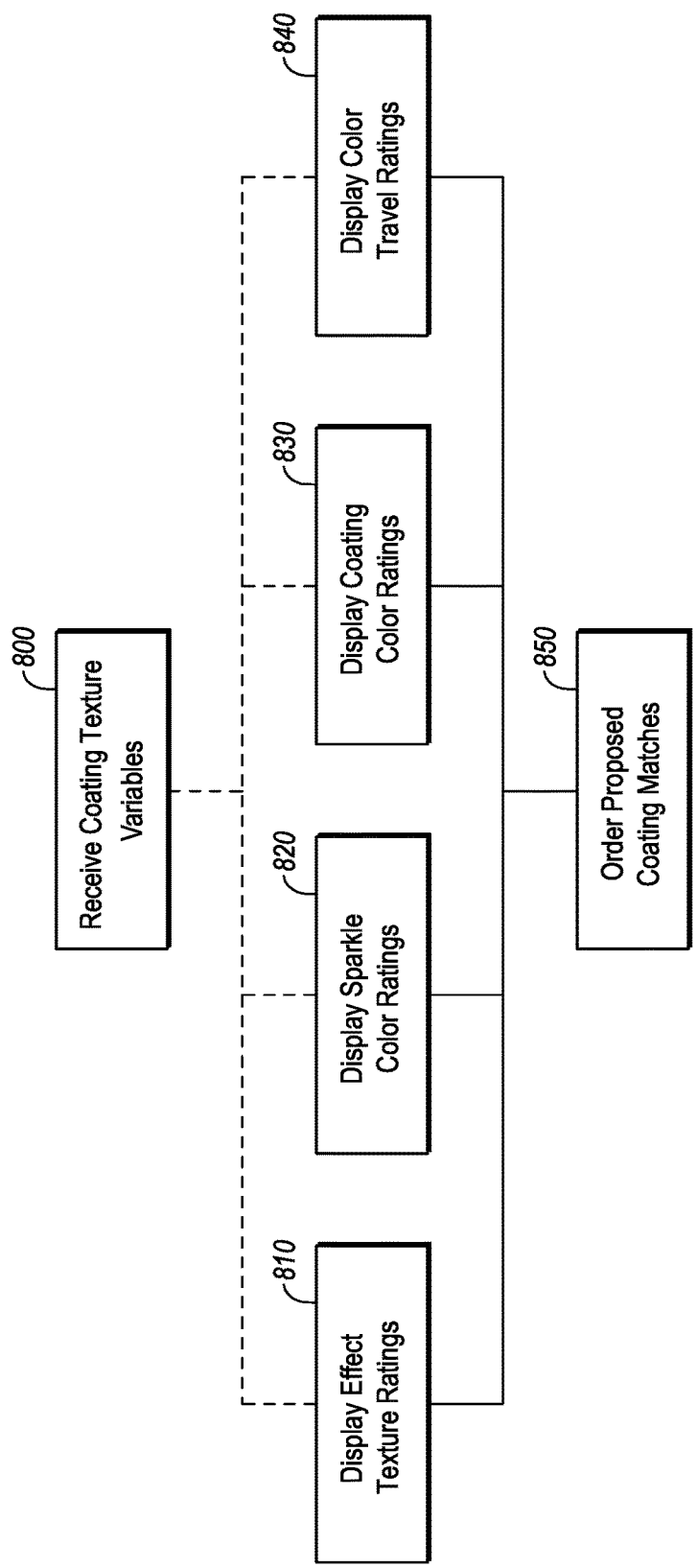
FIG. 8 depicts a flow chart of steps within a method for matching a paint sample to various proposed paint coatings in accordance with implementations of the present invention.

In order to provide the coating information, a system will initially correlate spectrophotometric data with coating information in a database. Along these lines, FIGS. 1-5 depict various schematic and mechanisms diagram for use in calculating a coating texture and corresponding coating matches for eventual display (while FIGS. 6-8 are directed to the display of the matches and underlying match data). For example, FIG. 1 depicts an exemplary computer system 105, which can comprise any number or combination of computing devices 160, such as the depicted desktop computer system, and/or any one or more laptop computers, mobile devices, and personal device assistants (PDAs), as well as more complex systems including remote data or application servers (not shown). FIG. 1 further shows that system 105 can include one or more coating information databases 140.

As understood more fully herein, coating information databases 140 can include a wide variety of information relevant to various coating characteristics, and human-perceptions of the coating characteristics, and can include data related to one or more "relative texture characteristic databases." FIG. 1 further shows that the one or more coating information databases 140 may be integrated within system 105, such as a data structure within coating texture calculation software application 100, or may be located within a purpose-built database that is located locally or remotely to the coating texture software application 100. One will appreciate that the software application program(s) 100, in turn, can comprise any number of computer-executable modules configured to execute the steps and functions described herein.

For purposes of this specification and claims, a "module" means a set of one or more logical, computer-executable functions and/or one or more computer application sub-routines, which are executed within the coating texture calculation software application 100. Whereas, a "component" is understood herein as a physical component that is used within the computer system 105, such as camera-enabled spectrophotometer 110. In addition, a "database" means a computer-based data structure, including, for example, linked lists, hash maps, SQL databases, and other organized-data. One of ordinary skill in the art will readily appreciate and understand that the above definitions for modules, components, and databases are somewhat arbitrary, and that one having skill in the art will be able to discern the scope and purpose of each respective module and component recited herein.

Returning to FIG. 1, in at least one embodiment, data input module 120 can be configured to receive from camera-enabled spectrophotometer 110 (or, herein, "spectrophotometer 110") certain "target coating texture variables" and coating color variables from an image taken from a target coating (not shown). As understood herein, a "target coating" generally means a coating, such as a paint, gloss, stain, or other applied treatment after application to a target object (not shown), such as a device, automobile, wall, etc. However, a target coating is not so limited, and in some implementations may include primarily unapplied solutions.

In addition, "target coating texture variables" mean raw data received from a target coating that reflect unique attributes of the target coating, which in turn is based at least in part on the underling texture elements (e.g., aluminum flakes, crushed mica, pearl, etc.) within the coating mixture. The texture elements combine with the coating to create corresponding texture effects that are reflected in the spectrophotometer data, and thus create a unique profile or signature from one coating to the next. Thus, by way of explanation, the "variable" aspect of this term generally owes to the notion that the received texture data taken by spectrophotometer 110 from the coated object will be generally consistent within the same coating with the same texture elements, but will "vary" at certain points in the data with coatings (same or different coatings) with different texture elements. Thus, as understood more fully herein, target coating texture variables are in essence a texture "signature" for the texture elements within a particular coating of a company's coating collection.

Although one will readily appreciate that different camera-enabled spectrophotometers (e.g., brands thereof) will relay different raw data and different variables as an output for any particular coating texture, the raw data between different camera-enabled spectrophotometers can still be processed in accordance with the present invention to provide a unique "signature" (or set of "target coating texture variables") from one coating to the next. This will generally be the case when a given camera-enabled spectrophotometer comprises an internally consistent scheme for measuring texture variables from a target coating. Hence, one will appreciate as understood more fully herein that the exact value of the data taken from any given spectrophotometer is not ordinarily as relevant as the variances in the data that are consistent among coatings with particular types of texture elements.

One will appreciate that the coating data can be obtained a number of different ways through spectrophotometer 110. In some embodiments, for example, the target coating texture variables may be derived from a photograph of a coating (taken from a camera without a spectrophotometer) that is analyzed within the coating texture calculated software application 100. In other embodiments, the target coating texture variables may be directly received from a camera-enabled spectrophotometer. In various embodiments, and as described above, the actual target coating texture variables received from the camera-enabled spectrophotometer 110 may depend upon the brand and type of camera-enabled spectrophotometer. For example, the actual target coating texture variables received from the camera-enabled spectrophotometer may comprise proprietary manipulations and outputs, such that the number of variables and measured texture attributes that are represented by each variable are uncertain to anyone but the producer of the specific camera-enabled spectrophotometer. Nevertheless, the data obtained from any given brand of camera-enabled spectrophotometer 110 will provide a unique texture signature for the analyzed coating texture.

FIG. 1 further shows that the software application 100 is in communication with camera-enabled spectrophotometer 110 via data input module 120. To accomplish this communication, one will appreciate that the data input module 120 can be in communication with (or otherwise implement) one or more application program interfaces ("API(s)") (not shown) that enable the software application 100 to receive input into and/or send output out of the coating texture calculating software application 100. This communication between data input module 120 and spectrophotometer 110 (and any intervening APIs) can be accomplished via any physical or wireless connection means and corresponding communication interface layers. In any case, camera-enabled spectrophotometer 110 provides the software application 100 with a set of target coating texture variables for a target coating.

In alternate implementations, the data input module 120 may directly receive an image of a coating. For example, one or more computing devices 160, on which software application 100 is installed, may further comprise a link to one or more cameras (not shown), and may enable the computing devices 160 to receive a photograph. One will appreciate that, in at least one implementation, software application 100 is in communication with a camera configured to take photographs with at least three-times optical zoom.

However the image data is received, the data input module 120 can be configured to analyze the image of the coating and calculate desired texture variables. For example, data input module 120 may utilize a black-and-white image taken from a coating sample to calculate the set of texture variables for the target coating because calculations can be simplified by removing color information. In other words, in at least one implementation, data input module 120 may be configured to first strip color from the received image file before calculation. In contrast, a color image can be used to calculate the set of texture variables for the target coating because additional texture information may be available in a color image that would not otherwise be accessible in a black-and-white image.

FIG. 1 further shows that data input module 120 can provide the coating color variables to a color match module 170. The "coating color variables" (or "coating variables") can be received from a spectrophotometer and processed using conventional methods. As understood herein, "coating color variables"/"coating variables" refers to measurable attributes of a (typically) cured coating, which attributes, in at least one implementation, are taken as raw data from a spectrophotometer or other similar data gathering device. Using the coating color variables, the color match module 170 can search a coating information database 140 for one or more colors that most closely match the color of the target coating. In at least one implementation, each of the colors stored within the coating information database 140 can be associated with a particular coating and with coating texture variables. For example, the color match module 170 may determine that the target coating comprises a forest green color that is similar to a particular group of colors stored within the coating information database 140.

Once one or more proposed matching colors have been identified, the color match module 170 can provide the texture calculating module 130 with one or more indicators (not shown) of the proposed matches. The indicators can comprise pointers to the proposed matches within the coating information database, to data structures comprising information about each proposed match, or to any other data communication that provides the texture calculating module 130 with access to the necessary coating information for the proposed matches.

As shown in FIG. 1, the texture calculation module 130 can then access, from within the coating information database 140, the coating texture variables that are associated with each of the one or more proposed coating matches. Using the coating texture variables associated with the proposed coating matches and the coating texture variables associated with the target coating, the texture calculation module 130 can calculate a correlation between the target coating and each of the proposed coating matches. Based upon the calculated correlation, the texture calculation module 130 can calculate a set of relative texture characteristics for the proposed coating matches that indicate relative differences in texture between the proposed coating matches and the target coating. Each of the relative texture characteristics can comprise an assessment over all angles of the target coating.

In one implementation, the relative texture characteristics can be based on human-provided relative visual impressions between different reference coatings. For example, the relative visual impressions can comprise human generated values pertaining to a relative coarseness, a relative sparkle intensity, and/or a relative sparkle density with respect to a plurality of different reference coatings. In one implementation, the relative impressions can be gathered from a large group of diverse individuals that have viewed several different coating samples with respect to each other. In such a case, the data may reflect impressions by the individuals as to various texture characteristics of the samples.

For instance, in at least one implementation, an individual can be prompted to rate the respective samples as having relatively more or less overall texture on a numeric scale. Similarly, individuals can rate the respective samples on a relative scale with respect to coarseness, sparkle intensity, and/or sparkle density. The relative impressions can then be statistically mapped to coating texture variables that are associated with each of the respective samples. Accordingly, a statistical correlation can be created between each of the coating texture variables received from the spectrophotometer and the human perception of various texture characteristics.

The texture calculation module 130 can utilize the statistical correlation of texture variables to identify a set of relative texture characteristics of the target coating (not shown) with respect to each of the proposed coating matches. For example, the texture calculation module 130 can calculate a relative coarseness value, a relative sparkle density value, and/or a relative sparkle intensity value of a proposed, matched coating. Additionally, the texture calculation module 130 can calculate an overall relative texture characteristic value for a proposed, matched coating based upon the set of relative texture characteristics determined from the texture variables. For example, the overall relative texture characteristic value can be directly derived from correlation to human perception, or the overall relative texture characteristic value can be calculated from an average of other relative texture data.

Upon receipt of data from a particular target coating via spectrophotometer 110 (or other appropriate camera device), the display module 150 can send display instructions for one or more graphics to a display unit on computing device 160. The graphics, in turn, display relative texture characteristics to a user through a graphical user interface, such that the user can easily identify the difference in texture characteristics between the target coating (not shown) and each of the proposed coating matches (not shown). One will appreciate that the displayed characteristics can take on multiple forms. In one embodiment, the displayed relative texture characteristics may comprise the single overall texture value, the relative coarseness value, the relative sparkle density value, and/or the relative sparkle intensity value for a matched coating. As such, various implementations of the present invention can significantly simplify and standardize the texture information that is displayed to an end user.

Providing a simple indication of a human-perceived difference between one or more coatings can provide significant improvements to the technical field of coating matching, particularly when relaying the information to an end-user through a display. In particular, providing a consistent and standard basis for distinguishing texture attributes of a coating addresses significant shortcomings in the technical art. As such, utilizing a statistically standardized approach to utilizing human-perception of texture differences can provide an innovative method for matching coating textures. For example, relative texture values can be provided with respect to all available coating compositions, such that it is not necessary to identify specific potential matching coatings in order to generate relative texture values. Instead, standardized texture values can be calculated based upon a color and texture space that includes one or more coating manufacturer's entire coating libraries. The results of these values used in matching the target coating can then be displayed to the user, as explained more fully with respect to FIGS. 6-8.

Figure 2A:
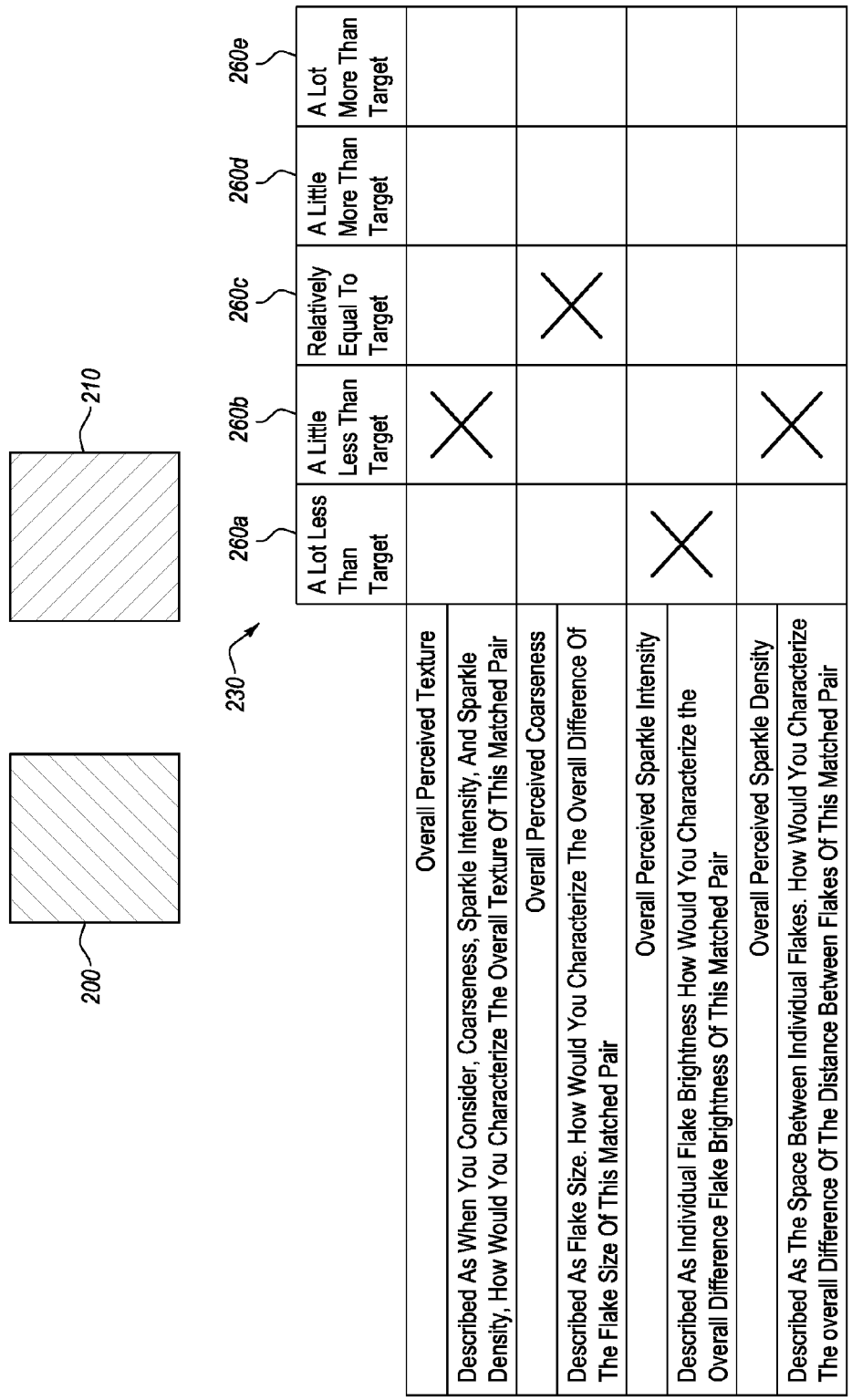
FIG. 2A depicts a relative texture characteristic chart and accompanying example coatings in accordance with implementations of the present invention.

FIG. 2A depicts an example of a chart 230 derived from gathering and utilizing human-perceived texture differences. In particular, FIG. 2A depicts a first example coating 200, a second example coating 210 and a human-perspective texture comparison chart 230. While the first example coating 200 and the second example coating 210 are depicted in image form in FIG. 2A, when presented to a user, the first example coating 200 and the second example coating 210 can also be actual painted and cured panels. As such, the user(s) are provided with true and accurate representations of the final coating color and texture.

The human-perspective texture comparison chart 230 is directed towards differences in visual appearance between the first example coating 200 and the second example coating 310. For example, the human-perspective texture comparison chart 230 requests that a human user indicate whether they perceive that the first example coating 200 comprises more or less overall perceived texture than the second example coating 210. As indicated by the human-perspective texture comparison chart 230 of FIG. 2A, a human user may be asked to rate the two example coatings 200, 210 with regards to a variety of different texture characteristics. Each rating may be provided using a predefined scale of rating options 260(*a-e*).

A large number of users with different racial, gender, and other demographic differences can be asked to compare the same two example coatings 200, 210 and provide their own respective perceived texture differences. The total resulting perceptions of the variety of users can then be respectively summarized such that a typical, or most-likely, predicted human-perceived texture comparison for each requested texture question is calculated.

In the example depicted in FIG. 2A, the user determined that the first example coating 200 comprises a "little less" overall perceived texture than the second example coating 210. Additionally, FIG. 2A shows that the user determined that the first example coating 200 comprises "relatively equal" perceived coarseness to the second example coating 210. Further, FIG. 2A shows that the user determined that the first example coating 200 comprises "a lot less" sparkle intensity than the second example coating 210. Further still, FIG. 2A shows that the user determined that the first example coating 200 comprises a "little less" sparkle density than the second example coating 210.

Figure 2B:
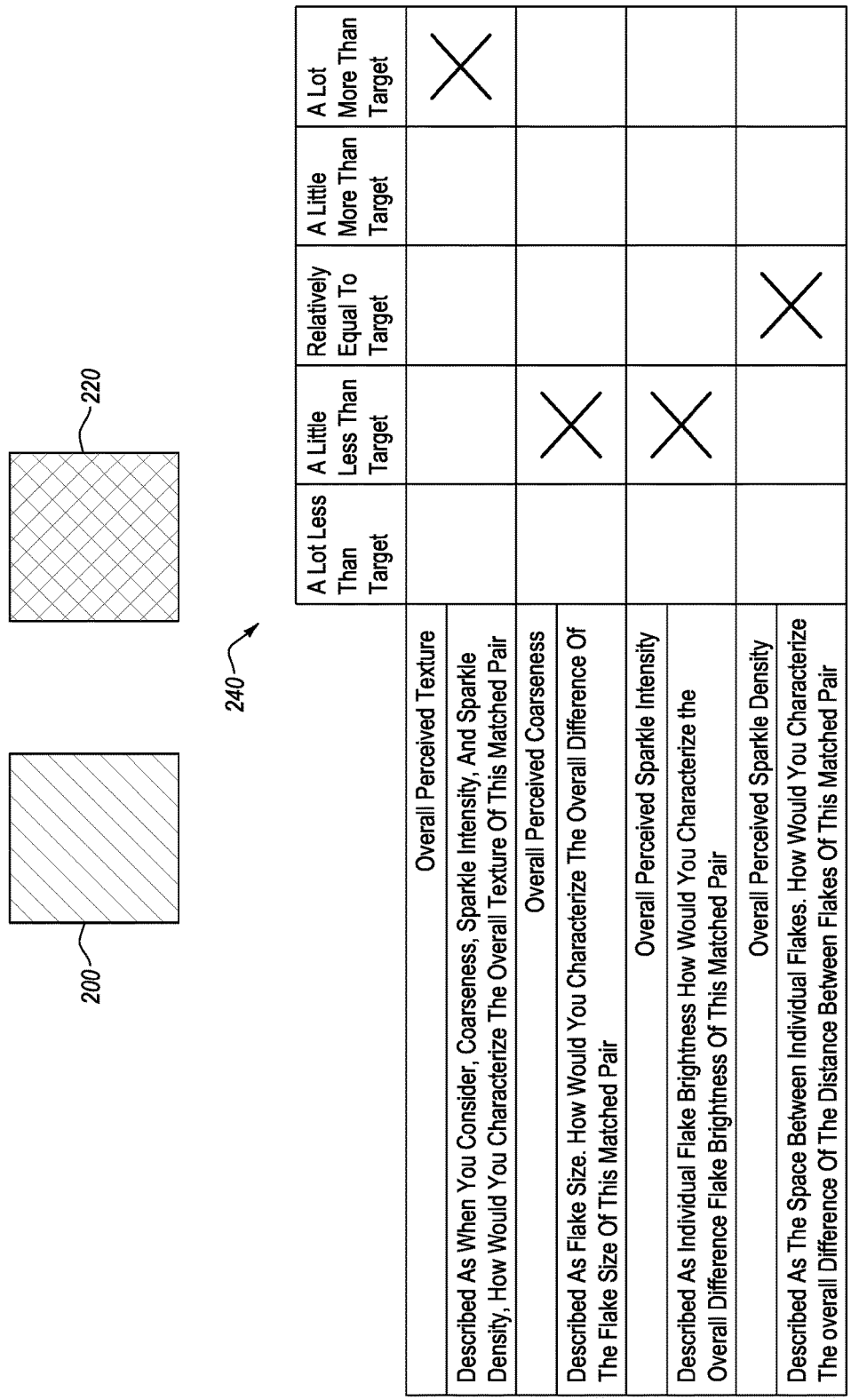
FIG. 2B depicts another relative texture characteristic chart and accompanying example coatings in accordance with implementations of the present invention.

FIG. 2B depicts a similar human-perspective texture comparison chart 230 to the one depicted in FIG. 2A. In FIG. 2B, however, the chart shows that the user compares the first example coating 200 to a third example coating 220. As indicated by the human-perspective texture comparison chart 240 of FIG. 2B, the third example coating 220 comprises a different texture characteristic profile than either the first example coating 200 or the second example coating 210.

FIG. 2C depicts yet another human-perspective texture comparison chart 230. In this particular depiction, a user is comparing the third example coating 220 to the second example coating 210. Accordingly, FIGS. 2A-2C illustrate several different results that may be derived from human-perceived comparisons between a variety of different example coatings and to provide human-perspective comparisons between the example coatings across a range of different texture characteristics. The human-perspective comparisons provided to the human-perspective texture comparison charts 230 of FIGS. 2A-2C can be translated into relative numerical values. The resulting values can then be stored in a coating information database 140.

Figure 3:
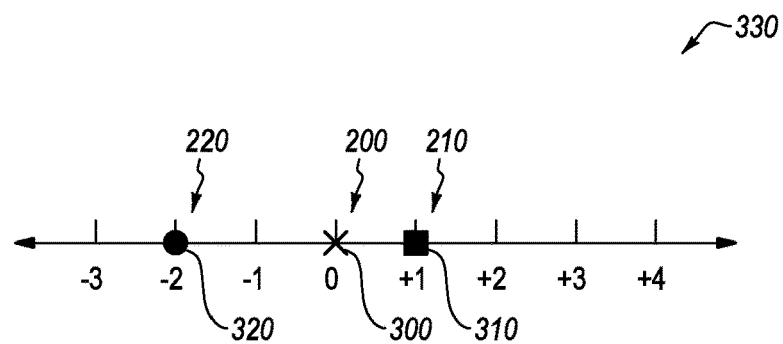
FIG. 3 depicts a line chart of relative texture characteristics in accordance with implementations of the present invention.

For example, FIG. 3 depicts a number line 330 with indications 300, 310, 320 of each respective example coating 200, 210, 220. In particular, FIG. 3 shows that the "X"

indication 300 represents the first example coating 200, while the square indicator 310 represents the second example coating 210, and the circle indicator 320 represents the third example coating 220. The illustrated number line 330 may represent the example coating's 200, 210, 220 relative relationships to each other with respect to their overall perceived texture. One will understand that the number line 330 is merely exemplary and is provided for the sake of clarity and example. In practice the relationship between various texture characteristics of different coatings may comprise a far more complex, multi-variable relationship that is much more difficult to conveniently depict and describe. Accordingly, the number line 330 is provided as a simplified example to establish various innovative and novel features in implementations of the present invention.

The human-perspective texture comparison charts 230, 240, 250 of FIGS. 2A-2C comprise five different relative indications 260(a-e). A relative value can be assigned to each indicator for each comparison between two respective example coatings, with one of the example coatings being considered the "target" from which the other example coating is to be compared. For example, the "a lot less than target" indicator 260a may be assigned a relative value of −2, the "a little less than target" indicator 260b may be assigned a relative value of −1, the "relatively equal to target" indicator 260c may be assigned a relative value of 0, the "a little more than target" indicator 260d may be assigned a relative value of +1, and the "a lot more than target" indicator 260e may be assigned a relative value of +2. One will understand that the above provided integers of −2, −1, 0, +1, +2 are provided for the sake of example and clarity. Various implementations can utilize different schemes, including non-integer and non-numerical schemes to quantify human-perception.

Returning to the human-perspective texture comparison in FIG. 2A with respect to "overall perceived texture," the user indicated that the first example coating 200 comprises "a little less" overall perceived texture than the second example coating 210. As such, a numerical value of −1 can be assigned to the first example coating 200 with respect to the second example coating 210.

In FIG. 2B with respect to "overall perceived texture," the user indicated that the first example coating 200 comprises "a lot more" overall perceived texture than the third example coating 220. As such, a numerical value of +2 can be assigned to the first example coating 200 with respect to the third example coating 220.

In FIG. 2C with respect to "overall perceived texture," the user indicated that the third example coating 220 comprises "a lot less" overall perceived texture than the second example coating 210. As such, a numerical value of −2 can be assigned to the third example coating 220 with respect to the second example coating 210.

An analysis of the above human-perspective texture comparison data reveals that the third example coating 220 comprises "a lot less" overall perceived texture than both the first example coating 200 and the second example coating 210. This conclusion can be reached based upon the assumption that the human-perspective texture comparison data in FIG. 2B, which indicates that the first example coating 200 comprises "a lot more" perceived texture than the third example coating 220, is the equivalent to the third example coating 220 comprising "a lot less" perceived texture than the first example coating 200. A further, similar analysis of the human-perspective texture comparison data reveals the second example coating 210 comprise a little more overall perceived texture than the first example coating 200 and a lot more overall perceived texture than the third example coating 220.

These relationships can be depicted by placing the "X" indicator 300 for the first example coating 200 at "0" on the number line 330. In this example, the first example coating 200 is placed at the "0" as a form of normalizing the numerical relationships around the median human-perspective texture comparison data point—in this case, the first example coating 200. The above data indicated that the second example coating 210 was +1 higher in texture than the first example coating 200. This relationship can be represented by placing the square indicator 210 for the second example coating 210 on the "+1" on the number line 330.

The placement of the third example coating 220 on the number line 300 may comprise accounting for two different human-perspective texture comparison data points. For example, the human-perspective texture comparison data indicates that the third example coating 220 comprises "a lot less" overall perceived texture than the second example coating 210. Additionally, the human-perspective texture comparison data indicates that the first example coating 200 comprises "a lot more" overall perceived texture than the third example coating 220. In other words, assigning a numerical value to the relationships would require that the third example coating 220 be assigned a numerical value of −2 with respect to both the first example coating 200 and the second example coating 210.

Because the first example coating 200 and the second example coating 210 have different overall perceived textures with respect to each other, in at least one implementation, the numerical value of −2 assigned to the third example coating 220 can be treated as a minimum difference. As such, the third example coating 220 can be placed on the number line 330, such that it is at least a numerical value of −2 lower than both the first example coating 200 and the second example coating 210. This relationship is depicted in FIG. 3 by placing the circle indicator 320 for the third example coating 220 at the "−2", while placing the "X" indicator 300 for the first example coating 200 at "0" on the number line 330, and placing the square indicator 210 for the second example coating 210 on the "+1" on the number line 330.

While the number line 330 of FIG. 3 is limited to data from the first example coating 200, the second example coating 210, and the third example coating 220, one will appreciate that in at least one implementation, the number line 330 can comprise information from a company's entire coating portfolio or from a large number of random coatings. Creating a number line 330 that accounts for a large number of coatings may result in a standard basis by which any coating (whether originally accounted for on the number line or not) can be rated. Stated more generally, comparing a large number of different coatings, and their associated textures, can result in a standard comparison metric by which textures can be universally compared. The universal standard may allow a user to enter a single coating into the coating texture calculation software application 100 and receive an indication of how the coating's texture compares with respect to the large number of randomly entered coating textures. Accordingly, in at least one implementation, the coating texture calculation software application 100 can provide standardized indicators regarding the texture of a particular coating, without requiring the user to enter specific comparison coatings.

Figure 4:
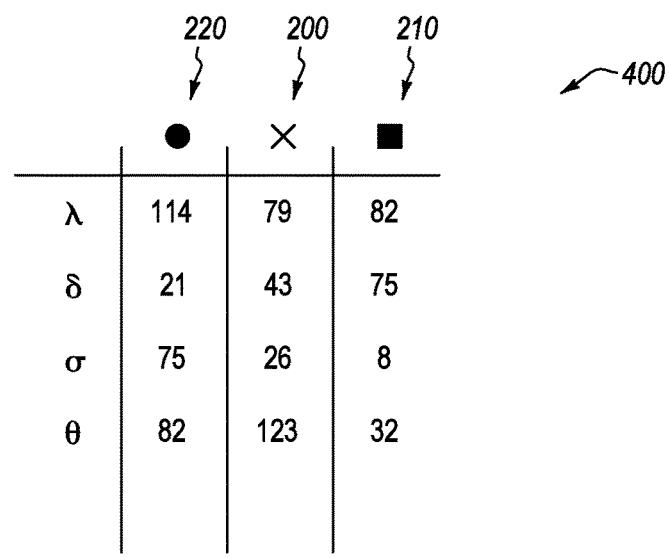
FIG. 4 depicts a table of texture variables in accordance with implementations of the present invention.

FIG. 4 depicts a coating analysis output data table 400 comprising example data received from a camera-enabled spectrophotometer 110. FIG. 4 depicts four exemplary target coating texture variables ($\lambda$, $\delta$, $\sigma$, and $\theta$) for the first example coating 200, the second example coating 210, and the third example coating 220, respectively. As used herein, the target coating texture variables $\lambda$, $\delta$, $\sigma$, and $\theta$, are merely exemplary. Various different camera-enabled spectrophotometers may provide unique proprietary output data. Similarly, in implementations where the coating texture calculation software application 100 processes images (i.e., photographs) itself, it may also provide a unique data set of output variables. Accordingly, the examples provided here with respect to variables $\lambda$, $\delta$, $\sigma$, and $\theta$ are merely for the sake of clarity and discussion and should not be read to limit the present invention to any particular method, system, or apparatus.

The coating analysis output data table 400 and the human-perspective texture comparison charts 230 can be statistically analyzed with pattern matching algorithms, machine learning techniques, or otherwise analyzed to identify correlations and patterns between the various variables within the data table 400 and the relative texture characteristics obtained by human-perspective texture comparisons. For example, it may be identified that there is an inverse relationship between the difference between $\lambda$ and $\delta$ and the overall perceived texture of a coating. For example, with respect to the third example coating 220, $\lambda$ is 114 and $\delta$ is 21, which results in a difference of 93. In contrast, the differences between $\lambda$ and $\delta$ for the first example coating 210 and the second example coating 200 are 36 and 7, respectively. As such, the third example coating 220 with the least amount of overall perceived texture comprises the greatest difference between $\lambda$ and $\delta$, while the second example coating with the greatest amount of overall perceived texture comprises the least difference between $\lambda$ and $\delta$.

In at least one implementation, correlations and/or relationships can be identified between the coating analysis output data table 400 and a wide variety of different random coatings. Additionally, the identified correlations and/or relationships can be used to derive formulas describing the identified correlations and/or relationships. As such, the coating texture calculation software application 100 can process a new, unique coating and interpolate various human-perspective texture characteristics.

Figure 5:
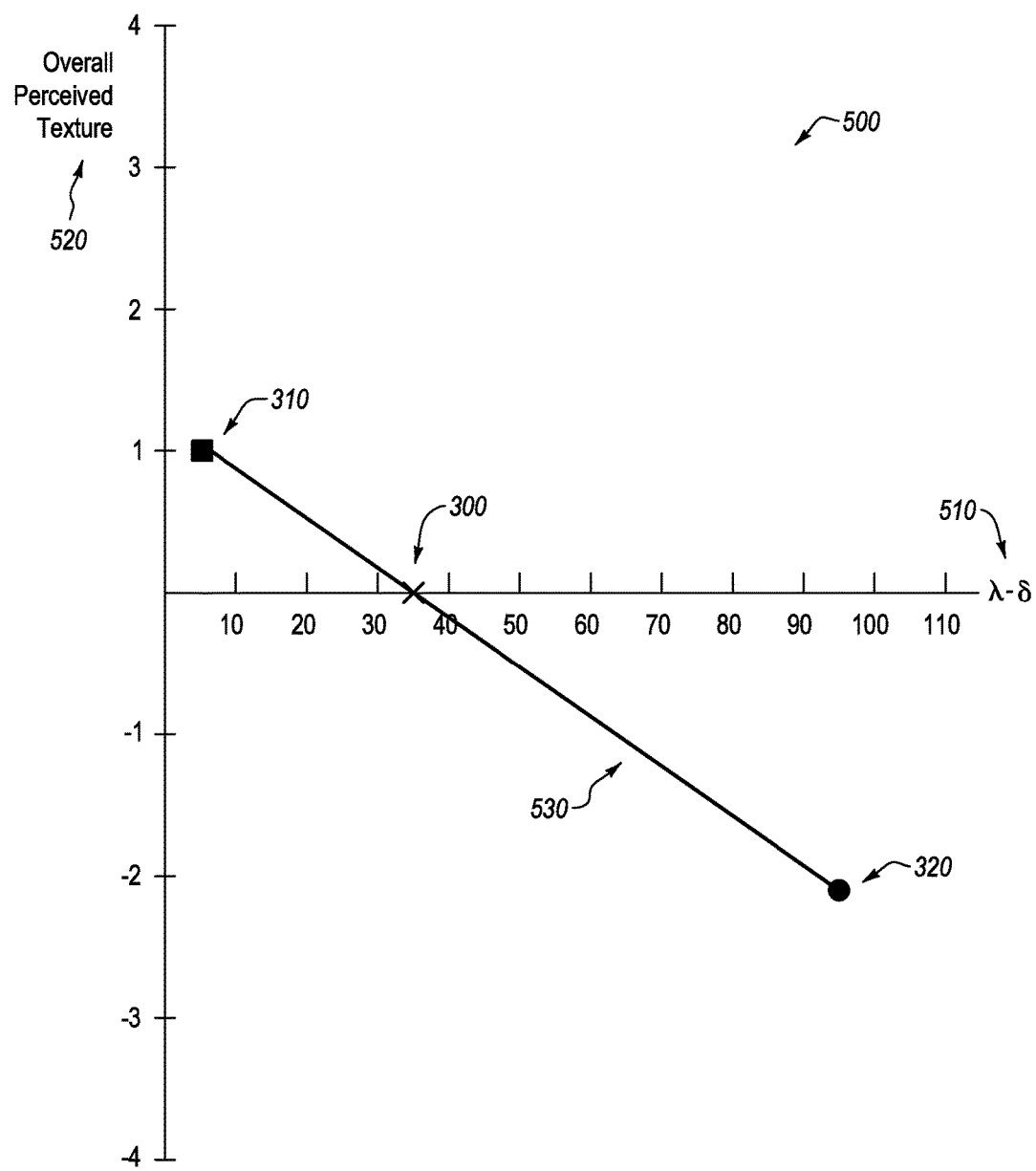
FIG. 5 depicts a graph of a correlation of perceived texture characteristics in accordance with implementations of the present invention.

For example, FIG. 5 depicts a graph 500 of the differences between $\lambda$ and $\delta$ for the first, second, and third example coatings, along with their respective overall perceived texture. In particular, the graph 500 depicts overall perceived texture 520 on the Y-axis and the difference between $\lambda$ and $\delta$ 510 on the X-axis. Additionally, using conventional curve fitting algorithms or other complex statistical analysis, an equation can be developed that draws a line 530 between each of the respective data points 310, 300, 320.

In at least one implementation, the equation can then be used to interpolate the overall relative perceived texture for other coatings, based upon the $\lambda$ and $\delta$ variables received from the respective target coating. While the equation of FIG. 5 is depicted as being linear and only depending upon the difference between $\lambda$ and $\delta$, in at least one implementation, the relationship between the received output variables and a particular perceived texture characteristics may be far more complex. As such, the graph 500 and relationship depicted in FIG. 5 is provided only for the sake of example and clarity. Accordingly, equations, similar to that presented in FIG. 5, can be used to numerically calculate various relative texture characteristics of coatings.

The resulting identified correlations and/or relationships can be used in the methods and systems according to the present invention in conjunction with color and sparkle match ratings for assisting users in easily and quickly evaluating and/or matching coatings based upon coating characteristics. For example, FIG. 6 depicts an exemplary coating information user interface 600 (also referred to herein as "graphical user interface") that can be generated by the display module 150 of FIG. 1. In the depicted implementation, the coating texture information user interface 600 is depicted as a webpage within a web browser; however, in alternate implementations the user interface 600 may be depicted within a standalone application, in association with a purpose-made texture identification device, or within any other system that provides a display device.

As disclosed above, at least one implementation of creating a user interface 600 comprises first receiving from a coating-measurement instrument of one or more coating variables, which include coating texture variables, wherein coating variables comprise data variables received from a particular coating-measurement device that describe coating texture, coating color, coating color travel, coating layers, and/or any other data that can be gathered from a coating. The coating-measurement instrument can comprise a spectrophotometer for detecting color data, a camera-enabled spectrophotometer for detecting color and texture data, a camera for gathering color and texture data, or any other device capable of measuring color characteristics and providing texture variables.

The coating variables may describe various coating characteristics associated with a target coating. For example, the coating variables may comprise one or more coating texture variables that are associated with one or more coating sparkle color characteristics, coating texture characteristics, coating color characteristics, coating color travel characteristics, or any other available coating characteristics provided by conventional coating-measurement instruments. The received coating texture variables may be in the form of various variables that have to be correlated to the desired coating sparkle color characteristics, coating texture characteristics, coating color characteristics, and/or coating color travel characteristics. The received coating texture variables may comprise proprietary information that is specific to a particular measurement device. The proprietary information can be mapped to desired texture attributes, such as the relative texture characteristics listed above. As such, an entire set of received coating texture variables may comprise subsets of variables that can be grouped as coating sparkle color characteristics, coating texture characteristics, coating color characteristics, coating color travel characteristics, or any other available coating characteristics provided by conventional coating-measurement instruments.

Using the systems and methods described above, in various implementations, the received coating variables can be used to calculate sparkle color ratings 650. A used herein, "ratings" comprise various visual depictions, numerical and graphical, used to display coating information about a particular coating, including relative texture characteristics, color measurements, absolute measurements of coating characteristics, and other similar coating information. One will understand, however, that in at least some embodiments a "rating" may also be equivalent to a "characteristics." For example, it may be desirable to directly display a characteristic in the user interface 600, in which case the displayed characteristics would also comprise a rating.

In at least one embodiment, techniques similar to those disclosed in PCT/US2015/057782, which is hereby incorporated by reference in its entirety, can be used for calculating a sparkle color rating. In short, an image of a coating can be obtained from a camera, a camera-enabled spectrophotometer, or any other source. The distribution of colored sparkles may then be determined within a coating at a multitude of angles. Because micas and xirallics change colors uniquely over various viewing angles and conditions, the appropriate pearl may be selected for a search or formulation algorithm, and a relative ratio as to the amount of each required to match the target coating may be estimated. Also, the sparkle color may be used to assist in selection of, for example, appropriate aluminums and other special effect pigments such as glass flake because the color of such materials does not shift over various angles. Thus, various ratios can be determined—for example, ratios of aluminums to pearls in effect coatings or ratios of green aluminum flakes to yellow aluminum flakes.

In various additional or alternative embodiments, a high pass filter may be applied to the target image to determine the brightest spots amongst the various pixels in the image. The resultant data/image may include information on only the bright locations. The high pass filter may convolve a matrix of values with a high value center point and low value edge points with the matrix of intensity information of the image. This isolates high intensity pixels. To further refine the sparkle points, an edge detection method of filtering may be applied in conjunction with the intensity filtering.

In various additional or alternative embodiments individual sparkle points may be labeled and counted, thus isolating/labeling them based upon hue range. As such, the described method may result in a count of labeled sparkle points, each meeting criteria based upon the individual hue criteria, which can then be formatted and output as desired.

Additional or alternative embodiments may include the use of a series of hue-based band pass filters that identify individual hue regions independent of lightness and/or brightness. Regional labeling and analysis of chroma and lightness (and/or brightness) of the regions may be used to isolate individual sparkle points within each hue band. Such a technique may determine sparkle points while estimating the percentage of the image that falls within each hue to enable a relatively quick analysis of color change in sparkle color over multiple images to supplement any further identification. In various embodiments, a band stop filter may be used in place of or in combination with a band pass filter.

As used herein, the sparkle color ratings can indicate a similarity between the one or more coating sparkle color characteristics of a target coating and respective coating sparkle color characteristics of each of the respective proposed coating matches. For example, the target coating may comprise a yellow-green aluminum flake color, while at least one of the proposed coating matches may comprise a yellow-blue aluminum flake color.

In at least one additional or alternative implementation, sparkle color characteristics can be calculated by calculating a percentage match of the sparkle color and ratio information from a target coating and the sparkle color and ratio information from one or more proposed match coatings. For example, the target coating may comprise a ratio of yellow-to-blue flakes of 1 yellow flake for every 2 blue flakes. In contrast, a proposed matched coating may comprise a ratio of 1 yellow flake for every 4 blue flakes. A resulting sparkle color rating may be 50% because the proposed match only comprises 50% of the target coatings sparkle color ratio.

Additionally, in additional or alternative embodiments, human perception can be used to calculate a relative sparkle color characteristic. For example, using techniques described above, a large group of individuals can provide their perceptions relating to comparative sparkle colors of several different coatings. Correlation functions can then be calculated based upon statistical relationships between the above calculated sparkle color ratios and the human perception data. The correlation function can then generate relative sparkle color ratings which can be displayed as sparkle color ratings (shown in sparkle color ratings column 650) as depicted in FIG. 6.

Additionally, the received coating texture variables can be used to calculate human-perceived relative effect texture characteristics. For example, the coating texture variables can be used to calculate human-perceived relative effect texture characteristics for multiple respective proposed coating matches. As used herein, the effect texture characteristics are also referred to herein as overall perceived texture characteristics (as shown and described with respect to FIGS. 2A-2C). The effect texture characteristics can indicate a similarity between the one or more coating characteristics of a target coating and respective coating textures characteristics of each of the respective proposed coating matches. For example, the target coating may comprise a relatively coarse aluminum flake effect, while at least one of the proposed coating matches may comprise a relatively fine aluminum flake effect. One will appreciate that the target coating and/or proposed coating match(es) may also or alternatively include a coarse aluminum flake effect, or other goino-apparent effect pigment/particle.

In any case, the effect texture characteristics can indicate whether the one or more coating characteristics associated with each respective proposed coating match is "more coarse," or "more fine" than the target coating. Additionally, in at least one implementation, the effect texture characteristics can indicate whether the one or more coating characteristics associated with each respective proposed coating match comprises more or less texture than the target coating. In at least one implementation, the indicated similarities are determined using correlations based upon human-perceived texture differences, as disclosed above. The effect texture characteristics can be displayed in various different useful forms as effect texture ratings (shown in effect texture ratings column 660).

The received coating variables can also be used to calculate conventional color coating characteristics and/or human-perceived relative coating color characteristics. For example, the coating color characteristics can be calculated using known color matching techniques that are then normalized to a desired scale for display. Additionally, or alternatively, the coating variables can be used to calculate human-perceived relative coating color characteristics for multiple respective proposed coating matches using methods similar to those described above with respect to FIGS. 2A-2C. For example, a correlation can be identified between the visual perceptions of multiple users regarding color similarity and the coating variables. As used herein, the coating color characteristics can indicate a similarity between the one or more coating color characteristics of a target coating and respective coating color characteristics of each of the respective proposed coating matches. For example, the target coating may comprise a deep blue color, while at least one of the proposed coating matches may comprise a midnight blue color. In at least one implementation, the indicated similarities are determined using correlations based upon human-perceived texture differences, as disclosed above. The determined color coating characteristics can then be displayed to a user in various different useful forms as a color coating rating (shown in color coating rating column 640).

Further, the received coating variables can also be used to calculate human-perceived relative color travel ratings. For example, the coating variables can be used to calculate color travel characteristics using conventional methods or to calculate human-perceived relative color travel characteristics for multiple respective proposed coating matches using methods similar to those described above. As used herein, the coating color travel characteristics can indicate a similarity between the one or more coating color travel variables of a target coating and respective coating color travel variables of each of the respective proposed coating matches. For example, the target coating may comprise a color that travels from a blue color to a green color over a specific angle transition, while at least one of the proposed coating matches may comprise a color that travels from a blue color to a gold color over the same angle transition. In at least one implementation, the indicated similarities are determined using correlations based upon human-perceived texture differences, as disclosed above. The color travel characteristics can then be displayed to a user in various different useful forms as a color travel rating (shown in color travel rating column 670).

Once a desired rating or combination of ratings are determined, a computer processor that is in communication with a display device can send instructions to generate a graphical representation of coating-related information on a user interface that depicts a visual ordering of at least a portion of the proposed coating matches. The overall rankings may indicate a similarity between the target coating and each of the proposed coating matches with respect to one or more of the various ratings.

In various implementations, the overall rankings may comprise a single rating for each proposed match that indicates the overall texture similarity between each respective proposed coating match and the target coating. In contrast, in at least one implementation, the overall rankings comprise one or more of a sparkle color rating, an effect texture rating, a coating color rating, and/or a color travel rating for each respective proposed match coating. Further, in at least one implementation, the ratings may be with respect to an entire color space, such that the target coating is associated with one or more ratings that are not with respective to specific proposed match coatings.

Returning now to the user interface 600 of FIG. 6, the user interface 600 depicts various implementations of ratings and other coating information. One will understand, however, that the depicted user interface is provided for clarity and is not meant to limit implementations of the user interface 600 to particular visual elements, layouts, or other similar depicted features.

The user interface 600 comprises various elements, including, a proposed match element 610, an image of the target coating 615, and a match information section 620. The proposed match element 610 may comprise information about a particular coating that was selected based upon it comprising the closest overall match to the target coating 615. For example, the proposed match element 610 may comprise information about a proposed match coating that comprises the least average differentiation between the proposed match coating's texture and color characteristics and the texture and color characteristics gathered from the target coating. Additional proposed match coatings may be ordered based using a similar calculation, where they are order by least average differentiation to greatest average differentiation.

The match information section 620 comprises various data columns 630, 640, 650, 660, 670, 680, 690, 695 for providing information about each respective proposed match. For example, the depicted exemplary match information section 620 comprises a proposed match coating image column 630, a match rating column 640 (indicting a color match), a sparkle color rating column 650, an effect texture rating column 660, a color travel rating column 670, a coating manufacturer column 680, a coating description column 690, and a paint system column 695. In alternate implementations, the match information section 620 may also comprise a column for effect coarseness that indicates whether a coating is more or less coarse than the target coating.

The proposed match coating image column 630 can comprise images of each respective proposed match coating. In at least one implementation, the images may comprise pictures of each of the proposed match coatings taken under similar light conditions. A user may compare the images within the proposed match coating image column 630 to the image of the target color 615. One will also appreciate that the actual images from the device can be presented in in the display in segmented angular-specific form, or in a continuous form. The actual images from the device can also or alternatively be presented in such a way that the images closely represent the visually perceived color and texture of the actual measured surface. In either case, implementations of the present invention enable the target and proposed matched coating be visually distinguishable in the software. This, in turn, enables a user to compare the images of the proposed coatings 630 with the image of the target coating 615, and hence the ability to visually distinguish between potential matches.

The match rating column 640 can comprise color coating ratings. The color coating ratings may indicate a similarity between the coating color of the target coating and respective coating colors of each of the proposed coating matches. The color coating ratings may be depicted in a variety of different forms. For example, in FIG. 6, the color coating ratings are depicted as a numerical value (with the lower numbers being a closer match to the target coating).

In at least one implementation, the depicted number may be derived using the human-perceived relative texture characteristics described above. For example, the depicted numerical values may be derived using a correlation similar to that depicted and described within respect to FIGS. 3 and 5. Additionally, in at least one implementation, the resulting values from the human-derived correlation function can be normalized to fit a particular scale (e.g., 1-100). Further, to increase the ease with which the number can be interpreted, in at least one implementation, the numbers can also be color-coded (which can, e.g., drive ease of decision making by the end-user), such that lower numbers are a particular color on a spectrum (e.g., green) while higher numbers are a different color on the spectrum (e.g., yellow or red).

The sparkle color column 650 can comprise sparkle color ratings. The sparkle color ratings may indicate a similarity between the coating sparkle color of the target coating and respective coating sparkle colors of each of the proposed coating matches. The sparkle color ratings may be depicted in a variety of different forms. For example, in FIG. 6, the color coating ratings are depicted as a numerical value. The numerical values and depictions thereof may also utilize the human-perceived relative texture characteristics described above. In the depicted implementation, the higher sparkle color ratings indicate a closer match. One will note that this association is opposite from the association within the matching ratings column 640. In at least one implementation, displaying contrasting rating systems may help prevent inadvertent misreading by a user.

The effect texture column 660 can comprise effect ratings. The effect texture ratings may indicate a similarity between the coating texture of the target coating and respective coating textures of each of the proposed coating matches. The effect texture ratings may be depicted in a variety of different forms. For example, in FIG. 6, the color coating ratings are depicted as a graphical slider.

The graphical slider may comprise various colors and/or increments that visually depict the similarity (or dissimilarity) between the effect texture of the target coating the effect textures of the various respective proposed coating matches. In at least one implementation, the graphical slider values may be derived using the human-perceived relative texture characteristics described above. For example, the relative values associated with the graphical slider may be derived using a correlation similar to that depicted and described within respect to FIGS. 3 and 5. Additionally, in at least one implementation, the resulting values from the human-derived correlation function can be normalized to fit a particular scale (e.g., −2 to +2).

Further, to increase the ease with which the number can be interpreted, in at least one implementation, the graphical slider can also be color-coded (again, e.g., to drive ease of decision making by the end-user) such that values within an ideal range are a particular color on a spectrum (e.g., green) while values outside of the ideal range are a different color on the spectrum (e.g., yellow or red). In at least one implementation, in addition to providing a user within an indication about the similarity between effect textures, the graphical slider also allows a user to determine whether a proposed matching coating comprises more or less effect texture than the target coating.

The color travel column 670 can comprise color travel ratings. The color travel ratings may indicate a similarity between the coating color travel of the target coating and respective coating color travels of each of the proposed coating matches. The color travel ratings may be depicted in a variety of different forms. For example, in FIG. 6, the color coating ratings are depicted as a textual description of the match. In particular, the texture descriptions comprise descriptions such as "OK," "Face: Lighter," "Face: Bluer," "Flop: Yellower," and "Flow: Redder, Yellower." As such, a user may be provided with an indication that the color travel is a match (i.e., "OK") or a description of the differences in the color travel.

In at least one implementation, the textual description may be derived using the human-perceived relative texture characteristics described above. For example, the depicted textual description may be derived using a correlation similar to that depicted and described within respect to FIGS. 3 and 5. For example, the resulting correlation values may be associated with specific color differences (e.g., yellower, redder, etc.). When describing the color travel of various proposed match coating, a description "OK" can be used to describe colors that fall within a desired threshold of the target coating. Color travel ratings associated with proposed match coatings that fall outside the threshold can then be described with a color difference, as determined by the human-perceived correlations.

The coating manufacturer column 680, coating description column 690, and paint system column 695 each depict various textual information relating to each respective proposed match coating. The depicted information can be gathered from a coating information database 140 (depicted in FIG. 1). The information may assist a user in both verifying a match and in ordering or mixing a desired coating. For example, the user may be searching for a paint match for a particular brand of automobile. Verifying that the proposed match coating is associated with the manufacturer for the particular brand of automobile may server to further verify that a proposed match is correct.

Accordingly, FIG. 6 depicts an implementation of a user interface 600 that depicts various columns 630, 640, 650, 660, 670, 680, 690, 695 for providing information about each respective proposed match. The depicted columns comprise various different visual depictions of ratings, including a graphical slider, a numerical value, and a textual description. While the visual depictions of ratings are each associated with particular columns and data in FIG. 6, one will understand that the particular visual depictions of ratings are only shown for the sake of example, and in alternate implementations, the respective visual depictions of ratings may be associated with other columns and data. As such, any of rating within the columns 630, 640, 650, 660, 670, 680, 690, 695 may be properly depicted using any combination of graphical sliders, numerical values, and/or textual descriptions.

In at least one implementation, when generating a user interface 600 the system can receive from a user a preferred rating. The preferred rating may comprise effect texture ratings, sparkle color ratings, coating color ratings, color travel ratings, or any other rating of interest. The overall rankings, or ordering, of the proposed coating matches may then by sorted based upon the preferred rating received from the user.

For example, a user may be particularly interested in matching the color travel of a target paint. Selecting the color travel rating as a preferred rating can cause the system to sort the proposed match coatings such that the color travel rating is prioritized. Prioritizing a particular rating may comprise simply sorting by the preferred ratings—without regard to the similarity of any other rating. In contrast, in an alternate implementation, prioritizing a particular rating may cause the system to rely upon the preferred rating when breaking ties between proposed matching colors. Further, in at least one implementation, prioritizing a particular rating may cause the system to weight the preferred rating with respect to the other rating such that proposed match coatings with similar preferred rating are sorted higher in the ranking than they otherwise would have been.

Similarly, in at least one implementation, when generating a user interface 600 the system can receive from a user one or more rating thresholds. The one or more rating thresholds may comprise user-defined acceptable thresholds relating to effect texture ratings, sparkle color ratings, coating color ratings, color travel ratings, or any other rating of interest. The overall rankings, or ordering, of the proposed coating matches may then be sorted based upon the user-defined acceptable thresholds received from the user.

For example, a user may be particularly interested in matching the effect texture of a target paint. To ensure a close match, the user can set a user-defined acceptable threshold for effect texture ratings of +/−3. In at least one implementation, the system will exclude all proposed coating matches that fail to meet the user-defined acceptable thresholds.

The user interface 600 can be rendered on a digital display, such as a digital display associated with computing device 160. The present invention can comprise a computerized method for execution in a computing system (such as computing device 160). The computerized system comprises a memory, at least one processor, and a storage device having stored instructions which, when executed by the at least one processor, cause one or more processors in the computerized system to display on a display device a graphical user interface 600 that enables an end user to match a target coating to another coating based on raw spectrophotometer data relevant to coating texture. The computer device 160 can display an icon 615 on a graphical user interface 600 that indicates a color of a target coating. The icon 615 can be selected by the computing device 160 in response to raw spectrophotometric data (e.g., coating texture variables) taken for a target coating applied to a target object (not shown).

The computing device 160 can also display a number indicating an amount of potential matches of the target coating to predetermined coating information stored in a database. For example, FIG. 6 indicates that there are "5 Potential Matches." The matches may be based on a correlation of texture variables from the target coating and human-provided impression data. For each potential match, the computing device 160 displays on the graphical user interface 600 an icon (shown in column 630) that visually represents the potential match, at least one field that visually indicates a manufacturer associated with the target object or the target coating (shown in FIG. 6 as "Acme"), at least one field that indicates a color value for the potential match (shown in FIG. 6 as "JV: Green"), and at least one field that visually indicates a texture value for the potential match (shown in column 660).

In at least one implementation, the computing system 160 can display a visual depiction of a slider bar (as shown in column 660). The location of the slider in the slider bar indicates a relative texture difference between the target coating and the potential match. For example, when the slider is in the middle of the slider bar, the target coating and the potential match have little or no relative texture difference. In contrast, if the slider is to the side of the middle, the potential match has either more or less texture than the target coating, depending upon the position of the slider.

Accordingly, the graphical user interface 600 can provide valuable information to an end user in an easy to understand, helpful form. The color data, texture data, sparkle color data, and other related data can be provided in the form of single numbers, bar charts, text description, or any other simple, useful form. An end user can quickly and easily identify a proposed matching coating of choice in an efficient and accurate manner.

Turning now to FIG. 7, FIG. 7 depicts another exemplary coating texture information user interface 700. In particular, FIG. 7 depicts a user interface 700 for describing only the target coating without any proposed match coatings. In the depicted implementation, the user interface 700 comprises an image 710, or photograph, of the target coating. Additionally, the user interface 700 depicts a name 712 associated with the target coating, a color value 714, and an overall texture rating 720. The name 712 may be provided manually by a user, may comprise a temporary sample name, or may be otherwise provided. The color value 714 may comprise a color match that is derived from the target coating itself. In various implementations, however, the color value 714 may not be depicted.

The overall texture rating 720 may comprise an overall texture value that describes in a single value the texture of the target coating. The overall texture rating 720 may be calculated directing from human-perspective texture comparison charts 250 (shown in FIG. 2) that directly request an "overall perceived texture" indication. In at least one implementation, however, the overall texture rating 720 can be calculated based upon a subset of other texture ratings, 740, 750, 760. For example, the overall texture rating 720 can be calculated by averaging at least the sparkle color rating 740, the effect texture rating 750, and the color travel rating 760.

In at least one implementation, the user interface 700 can also comprise a data portion 770 that allows a user to view conventional texture data. For example, the data portion 770 may be visually expandable to display all data and variables received from a coating-measurement instrument. In at least one implementation, however, the data portion 770 is initially hidden from view, such that the interface 700 depicts a simple and clean organization of information. Additionally, in at least one implementation, the texture ratings 730, 740, 750, 760, other than the overall rating 720, are also not depicted initially.

As depicted, the user interface 700 can display various texture ratings 720, 740, 750, 760 for a target color 710 without respect to particular proposed match coating ratings. In at least one implementation, the various depicted ratings 720, 730, 740, 750, 760 are calculated with respect to large number of other coating configurations. For example, the ratings 720, 730, 740, 750, 760 may be calculated with respect to every other coating stored within the coating information database 140. In contrast, in at least one implementation, the ratings 720, 730, 740, 750, 760 can be calculated with respect to a specific color space, defined either automatically or by a user. For example, a user may wish to know the each of the ratings 720, 730, 740, 750, 760 for the target color 710 with respect to the coatings provided by a particular manufacturer. As such, each of the ratings 720, 730, 740, 750, 760 can be calculated as compared to every coating provided by that particular manufacturer.

Accordingly, FIGS. 1-7 and the corresponding text depict or otherwise describe various implementations of the present invention that are adapted to analyze a paint sample and generate values that describe various attributes of a target coating. In particular, the implementations of a user interface described above can display simple texture ratings that describe various unique aspects of texture characteristics. Additionally, in at least one implementation, a user interface can display ratings that are based upon human-perceptions of various textures and coatings.

For example, FIG. 8 illustrates that a method for matching a paint sample to various proposed paint coatings can include an act 800 of receiving coating variables. Act 800 can comprise receiving one or more coating variables of a target coating from a coating-measurement instrument. For example, as depicted and described with respect to FIG. 1, a coating texture calculation software application 100 (e.g., executed on computer system 160) can receive from a camera-enabled spectrophotometer 110 various coating variables.

Additionally, FIG. 8 shows that the method can include, in any order, one or more of act 810, act 820, act 830, and/or act 840 for displaying effect texture ratings, sparkle color ratings, coating color ratings, and/or coating travel ratings, respectively. Acts 810-840 can comprise displaying respective ratings 810, 820, 830, 840 for multiple respective proposed coating matches on a digital display device. The respective ratings can indicate a similarity between the one or more coating characteristics of the target coating and respective coating characteristics of each of the respective proposed coating matches. For example, as depicted and described in FIGS. 6 and 7 and the accompanying descriptions, a user interface 600, 700 can display any combination of an overall texture rating 720, a match rating 640, 730, a sparkle color rating 650, 740, an effect texture rating 660, 740, a color travel rating 670, 760, or any other coating rating.

FIG. 8 also shows that the method can include an act 850 of ordering proposed coating matches. Act 850 can comprise ordering at least a portion of the proposed coating matches. The ordering indicates a strength in similarity between the target coating and each of the at least a portion of the proposed coating matches with respect to the coating texture ratings. For example, as depicted and described with respect to FIG. 6, a set of proposed coating matches 620 can be sorted based upon the similarity of each respective proposed match coating with respect to the various coating ratings 640, 650, 660, 670.

Accordingly, implementations of a texture matching computer system can provide unique and novel methods and systems for processing and displaying coating-specific texture information. Additionally, implementations of a texture information user interface can display a single overall texture rating or a set of attribute-specific texture ratings. Further, in at least one implementation, the various texture ratings can be based upon human-perceived correlations.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention therefore relates in particular, without being limited thereto, to the following aspects:

1. A computer implemented method comprising: receiving, using at least one processor, one or more coating characteristics of a target coating selected from sparkle color characteristics, coating texture characteristics, coating color characteristics and coating color travel characteristics and combinations thereof from a coating-measurement instrument; accessing, using the processor, a database comprising corresponding coating characteristics for a plurality of reference coatings and associated comparative human ratings of the visual appearance of different reference coatings; identifying, using the processor, a plurality of prospective matching coatings from the plurality of reference coatings; determining, using the processor, based on the received one or more coating characteristics of the target coating and the data stored in the database, ratings indicating similarity between the target coating and each of the identified prospective matching reference coatings with respect to one or more of the coating characteristics; displaying, using the processor, the determined ratings for at least a portion of the plurality of prospective matching reference coatings to a user; and ordering, using the processor, at least a portion of the prospective matching reference coatings based on the determined ratings with respect to one or more of the coating characteristics.

2. The computer implemented method according to aspect 1, wherein: the step of receiving, using the processor, one or more coating characteristics of the target coating from the coating-measurement instrument comprises receiving, using the processor, one or more coating texture characteristics of the target coating; the step of determining ratings indicating similarity between the target coating and each of the identified prospective matching reference coatings with respect to one or more of the coating characteristics comprises determining, using the processor, based on the received one or more coating texture characteristics of the target coating and the data stored in the database, ratings indicating similarity between the target coating and each of the identified prospective matching reference coatings with respect to one or more of the coating texture characteristics; and wherein the ordering is based on the determined ratings with respect to one or more of the coating texture characteristics.

3. The computer implemented method according to aspect 2, wherein: the step of receiving, using the processor, one or more coating characteristics of the target coating from the coating-measurement instrument further comprises receiving, using the processor, one or more sparkle color characteristics of the target coating; the step of determining ratings indicating similarity between the target coating and each of the identified prospective matching reference coatings with respect to one or more of the coating characteristics further comprises determining, using the processor, based on the received one or more sparkle color characteristics of the target coating and the data stored in the database, ratings indicating similarity between the target coating and each of the identified prospective matching reference coatings with respect to one or more of the sparkle color characteristics, and wherein the ordering is also based on the determined ratings with respect to one or more of the sparkle color characteristics.

4. The computer implemented method according to aspect 2 or 3, wherein: the step of receiving, using the processor, one or more coating characteristics of the target coating from the coating-measurement instrument further comprises receiving, using the processor, one or more coating color characteristics of the target coating; the step of determining ratings indicating similarity between the target coating and each of the identified prospective matching reference coatings with respect to one or more of the coating characteristics comprises determining, using the processor, based on the received one or more coating color characteristics of the target coating and the data stored in the database, ratings indicating similarity between the target coating and each of the identified prospective matching reference coatings with respect to one or more of the coating color characteristics, and wherein the ordering is also based on the determined ratings with respect to one or more of the coating color characteristics.

5. The computer implemented method according to any one of the preceding aspects, further comprising: receiving a preferred characteristic from a user input, wherein the preferred characteristic is a coating texture characteristic, a coating sparkle color characteristic, or a coating color characteristic; and wherein the ordering is determined by prioritizing the preferred characteristic.

6. The computer implemented method according to any one of the preceding aspects, further comprising: receiving from a user one or more characteristic thresholds, wherein the one or more characteristic thresholds define user-defined acceptable thresholds relating to one or more coating texture characteristic(s), one or more coating sparkle color characteristic(s), and/or one or more coating color characteristic(s); and wherein the ordering accounts for the one or more characteristic thresholds.

7. The computer implemented method according to any one of the preceding aspects 2-6, wherein: the step of receiving, using the processor, one or more coating characteristics of the target coating from the coating-measurement instrument further comprises receiving, using the processor, one or more coating color travel characteristics of the target coating; the step of determining ratings indicating similarity between the target coating and each of the identified prospective matching reference coatings with respect to one or more of the coating characteristics comprises determining, using the processor, based on the received one or more coating color travel characteristics of the target coating and the data stored in the database, ratings indicating similarity between the target coating and each of the identified prospective matching reference coatings with respect to one or more of the coating color travel characteristics, and wherein the ordering is also based on the determined ratings with respect to one or more of the coating color travel characteristics.

8. The computer implemented method according to aspect 7 comprising displaying, using the processor, the determined ratings indicating similarity between the target coating and each of the identified prospective matching reference coatings with respect to one or more of the coating color travel characteristics for at least a portion of the plurality of prospective matching reference coatings to a user, wherein the displaying comprises displaying a visual indication indicating a difference in face or flop color.

9. The computer implemented method according to any one of the preceding aspects 2-8 comprising displaying, using the processor, the determined ratings indicating similarity between the target coating and each of the identified prospective matching reference coatings with respect to one or more of the coating texture characteristics for at least a portion of the plurality of prospective matching reference coatings to a user, wherein the displaying comprises (a) displaying a visual indication indicating whether the one or more coating texture characteristics associated with each of the prospective matching reference coatings is more coarse or more fine compared to the target coating, and/or (b) displaying a visual indication indicating whether the one or more coating texture characteristics associated with each of the prospective matching reference coatings comprise more or less texture compared to the target coating.

10. The computer implemented method according to any one of the preceding aspects wherein the coating-measurement instrument is a camera-equipped spectrophotometer.

11. A system comprising: a user interface comprising a display; a database comprising one or more coating characteristics for a plurality of reference coatings and associated comparative human ratings of the visual appearance of different reference coatings; a coating-measurement instrument; at least one processor in communication with the user interface, the database and the coating-measurement instrument, wherein the at least one processor is configured to: receive from the coating-measurement instrument one or more coating characteristics of a target coating selected from sparkle color characteristics, coating texture characteristics, coating color characteristics, coating color travel characteristics and combinations thereof; identify a plurality of prospective matching coatings from the plurality of reference coatings in the database; determine, based on the received one or more coating characteristics of the target coating and the data stored in the database, ratings indicating similarity between the target coating and each of the identified prospective matching reference coatings with respect to one or more of the coating characteristics; display the determined ratings for at least a portion of the plurality of prospective matching reference coatings on the display to a user; and order at least a portion of the prospective matching reference coatings based on the determined ratings with respect to one or more of the coating characteristics.

12. The system according to aspect 11, wherein the processor is configured to: receive from the coating-measurement instrument one or more coating texture characteristics of the target coating; determine, based on the received one or more coating texture characteristics of the target coating and the data stored in the database, ratings indicating similarity between the target coating and each of the identified prospective matching reference coatings with respect to one or more of the coating texture characteristics; and wherein the ordering is based on the determined ratings with respect to one or more of the coating texture characteristics.

13. The system according to aspect 12, wherein the processor is further configured to: receive from the coating-measurement instrument one or more sparkle color characteristics of the target coating; determine, based on the received one or more sparkle color characteristics of the target coating and the data stored in the database, ratings indicating similarity between the target coating and each of the identified prospective matching reference coatings with respect to one or more of the sparkle color characteristics; and wherein the ordering is also based on the determined ratings with respect to one or more of the sparkle color characteristics.

14. The system according to aspect 13, wherein determining the ratings indicating similarity between the target coating and each of the identified prospective matching reference coatings with respect to one or more of the sparkle color characteristics comprises calculating a coating sparkle color ratio of first colored sparkles to second colored sparkles.

15. The system according to any one of aspect 12 to aspect 14, wherein the processor is further configured to: receive from the coating-measurement instrument one or more coating color characteristics of the target coating; determine, based on the received one or more coating color characteristics of the target coating and the data stored in the database, ratings indicating similarity between the target coating and each of the identified prospective matching reference coatings with respect to one or more of the coating color characteristics; and wherein the ordering is also based on the determined ratings with respect to one or more of the coating color characteristics.

16. The system according to any one of the preceding aspects 11-15, wherein the processor is further configured to: receive via the user interface a preferred characteristic from a user, wherein the preferred characteristic is a coating texture characteristic, a coating sparkle color characteristic, or a coating color characteristic; and wherein the ordering is determined by prioritizing the preferred characteristic.

17. The system according to any one of the preceding aspects 11-16, wherein the processor is further configured to: receive via the user interface from a user one or more characteristic thresholds, wherein the one or more characteristic thresholds define user-defined acceptable thresholds relating to one or more coating texture characteristic(s), one or more coating sparkle color characteristic(s), and/or one or more coating color characteristic(s); and wherein the ordering accounts for the one or more characteristic thresholds.

18. The system according to any one of the preceding aspects 12-17, wherein the processor is further configured to: receive from the coating-measurement instrument one or more coating color travel characteristics of the target coating; determine, based on the received one or more coating color travel characteristics of the target coating and the data stored in the database, ratings indicating similarity between the target coating and each of the identified prospective matching reference coatings with respect to one or more of the coating color travel characteristics; and wherein the ordering is also based on the determined ratings with respect to one or more of the coating color travel characteristics.

19. The system according to any one of the preceding aspects 12-18 wherein the processor is further configured to display to the user on the display (a) a visual indication indicating whether the one or more coating texture characteristics associated with each of the prospective matching reference coatings is more coarse or more fine compared to the target coating, and/or (b) a visual indication indicating whether the one or more coating texture characteristics associated with each of the prospective matching reference coatings comprise more or less texture compared to the target coating.

20. The system according to any one of the preceding aspects 11-19, wherein the coating-measurement instrument is a camera-equipped spectrophotometer.

21. A non-transitory computer readable medium including software for causing a processor to: receive from a coating-measurement instrument one or more coating characteristics of a target coating selected from sparkle color characteristics, coating texture characteristics, coating color characteristics, coating color travel characteristics and combinations thereof; access a database comprising corresponding coating characteristics for a plurality of reference coatings and associated comparative human ratings of the visual appearance of different reference coatings; identify a plurality of prospective matching coatings from the plurality of reference coatings in the database; determine, based on the received one or more coating characteristics of the target coating and the data stored in the database, ratings indicating similarity between the target coating and each of the identified prospective matching reference coatings with respect to one or more of the coating characteristics; display the determined ratings for at least a portion of the plurality of prospective matching reference coatings on the display to a user; and order at least a portion of the prospective matching reference coatings based on the determined ratings with respect to one or more of the coating characteristics.

22. For a graphical user interface, a computerized method for execution in a computing system, the computerized system comprising a memory; at least one processor; and a storage device having stored instructions which, when executed by the at least one processor, cause one or more processors in the computerized system to display on a display device a graphical user interface that enables an end user to match a target coating to another coating based on raw spectrophotometer data relevant to coating texture, the method comprising: displaying an icon on a graphical user interface that indicates a color of a target coating, wherein the icon is selected by the computing system in response to raw spectrophotometric data taken for a target coating applied to a target object; displaying a number indicating an amount of potential matches of the target coating to predetermined coating information stored in a database, wherein the matches are based on a correlation of texture variables from the target coating and human-provided impression data; and for each potential match displayed on the graphical user interface: displaying an icon that visually represents the potential match; displaying a visual depiction of a slider bar, wherein the slider bar indicates a relative texture difference between the target coating and the potential match; displaying at least one field that visually indicates a manufacturer associated with the target object or the target coating; displaying at least one field that indicates a color value for the potential match; and displaying at least one field that visually indicates a texture value for the potential match.

23. A computerized method for execution on a computer system, comprising one or more processors, system memory, and one or more computer-readable media storing computer-executable instructions, the method for displaying matches of a paint sample to various proposed paint coatings, comprising the acts of: receiving one or more coating texture variables of a target coating from a coating-measurement instrument; displaying, on a digital display device, effect texture ratings for multiple respective proposed coating matches on a digital display device, wherein the effect texture ratings indicate a similarity between the one or more coating texture variables of the target coating and respective coating textures variables of each of the respective proposed coating matches; and ordering the proposed coating matches, wherein the ordering indicates a strength in similarity between the target coating and each of the proposed coating matches with respect to the effect texture ratings.

24. The method as recited in aspect 23, further comprising: receiving from the coating-measurement instrument one or more sparkle color variables of the target coating; displaying, on the digital display device, sparkle color ratings for each proposed coating match, wherein the sparkle color ratings indicate a similarity between the one or more sparkle color variables of the target coating and respective sparkle color variables of each proposed coating match; and wherein the ordering also indicates a strength in similarity between the target coating and each proposed coating match with respect to the sparkle color ratings.

25. The method as recited in aspect 24, further comprising: receiving from the coating-measurement instrument one or more coating variables of the target coating; displaying, on the digital display device, coating color ratings for each proposed coating match, wherein the coating color ratings indicate a similarity between the one or more coating color variables of the target coating and respective coating color variables of each proposed coating match; and wherein the ordering also indicates a strength in similarity between the target coating and each proposed coating match with respect to the coating color ratings.

26. The method as recited in aspect 25, further comprising: receiving a preferred rating from a user input, wherein the preferred rating is effect texture, coating sparkle color, or coating color; and wherein the ordering is determined by prioritizing the preferred rating.

27. The method as recited in aspect 25, further comprising: receiving from one or more rating thresholds from a user input, wherein the one or more rating thresholds define user-defined acceptable thresholds relating to effect texture, coating sparkle color, or coating color; and wherein the ordering accounts for the one or more rating thresholds.

28. The method as recited in aspect 23, further comprising: receiving from the coating-measurement instrument one or more coating color travel variables of the target coating; displaying, on the digital display device, coating color travel ratings for each proposed coating match, wherein the coating color travel ratings indicate a similarity between the one or more coating color travel variables of the target coating and respective coating color travel variables of each proposed coating match; and wherein the ordering also indicates strength in similarity between the target coating and each proposed coating match with respect to the coating color travel ratings.

29. The method as recited in aspect 28, wherein displaying the coating color travel ratings for each proposed coating match comprises displaying a visual indication indicating a difference in face or flop color.

30. The method as recited in aspect 23, wherein displaying the effect texture ratings comprises displaying a visual indication indicating whether each proposed coating match is more coarse or more fine than the target coating.

31. The method as recited in aspect 23, wherein displaying the effect texture ratings comprises displaying an effect texture visual indication indicating whether each proposed coating match comprises more or less texture than the target coating.

32. A computerized method for execution on a computer system comprising a display device, one or more processors, system memory, the method for displaying values that describe various attributes of one or more proposed, matching colors, the method comprising: receiving from a coating-measurement instrument a plurality of coating variables of a target coating; receiving data for multiple respective proposed coating matches with the target coating, wherein the data comprise color data, texture data, and one or more sparkle color ratings, wherein the multiple respective proposed coating matches are matched based at least in part on a match of sparkle color variables with the target coating; displaying in a user interface the received sparkle color ratings of each proposed coating match; and displaying an overall ranking of each proposed coating match, wherein the overall ranking indicates a similarity of sparkle color ratings with the target coating and each proposed coating match.

33. The method of aspect 32, wherein: the received texture data comprise effect texture ratings for each proposed coating match, the effect texture ratings indicating a similarity between one or more coating texture variables of the target coating and respective coating textures variables of each proposed coating match; and the overall ranking also indicates a similarity of effect texture ratings with the target coating and each proposed coating match.

34. The method of aspect 33, wherein: the received color data comprise coating color ratings for each proposed coating match, the coating color ratings indicating a similarity between the one or more coating color variables of the target coating and respective coating color variables of each proposed coating match; and the overall ranking also indicates a similarity of coating color ratings with the target coating and each proposed coating match.

35. The method of aspect 34, further comprising: receiving data corresponding to a user's preferred rating, wherein the preferred rating is effect texture, sparkle color, or coating color; and wherein the overall ranking also indicates the preferred rating.

36. The method of aspect 34, further comprising: receiving data corresponding to one or more rating thresholds, wherein the one or more rating thresholds define user-defined acceptable thresholds relating to effect texture, coating sparkle color, or coating color; and wherein the overall ranking accounts for the one or more rating thresholds.

37. The method of aspect 32, further comprising: receiving data corresponding to coating color travel ratings for each proposed coating match, wherein the coating color travel ratings indicate a similarity between the one or more coating color travel variables of the target coating and respective coating color travel variables of each proposed coating match; and wherein the overall rankings also indicate a similarity of the coating color travel ratings with the target coating and each proposed coating match.

38. The method of aspect 33, wherein the effect texture ratings for each proposed coating match further indicate whether each proposed coating match is more coarse or more fine than the target coating.

39. The method of aspect 33, wherein the effect texture ratings indicate for each proposed coating match indicate whether each proposed coating match has more or less texture than the target coating.

40. The method of aspect 32, wherein the displayed overall ranking based on sparkle color ratings also indicates a sparkle color ratio of a first colored texture sparkle to a second colored texture sparkle within the target coating.

41. A computer program product comprising one or more computer storage media having stored thereon computer-executable instructions that, when executed at a processor, cause the computer system to perform a method for displaying matches of a paint sample to various proposed paint coatings, the method comprising: receiving one or more coating texture variables of a target coating from a coating-measurement instrument; displaying, on a digital display device, effect texture ratings for multiple respective proposed coating matches on a digital display device, wherein the effect texture ratings indicate a similarity between the one or more coating texture variables of the target coating and respective coating textures variables of each of the respective proposed coating matches; and ordering the proposed coating matches, wherein the ordering indicates a strength in similarity between the target coating and each of the proposed coating matches with respect to the effect texture ratings.

42. A computerized method for execution in a computing system, the computerized system comprising a memory; at least one processor; and a storage device, the method for displaying on a display device a graphical user interface that matches a target coating to another coating based on raw spectrophotometer data relevant to coating texture, the method comprising: displaying an icon on a graphical user interface that indicates a color of a target coating, wherein the icon is selected by the computing system in response to raw spectrophotometric data taken for a target coating applied to a target object; displaying a number indicating an amount of potential matches of the target coating to predetermined coating information stored in a database, wherein the matches are based on a correlation of texture variables from the target coating and human-provided impression data; and for each potential match displayed on the graphical user interface: displaying an icon that visually represents the potential match; displaying a visual depiction of a slider bar, wherein the slider bar indicates a relative texture difference between the target coating and the potential match; displaying at least one field that visually indicates a manufacturer associated with the target coating; displaying at least one field that visually indicates a color value for the potential match; and displaying at least one field that visually indicates a texture value for the potential match.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer system for displaying matches of a paint sample to various proposed paint coatings, comprising:
   one or more processors; and
   one or more computer-readable media having stored thereon executable instructions that when executed by the one or more processors configure the computer system to perform at least the following:
   receive one or more coating texture variables of a target coating from a coating-measurement instrument;
   display, for multiple respective proposed coating matches on a digital display device, at least the following separate ratings:
      effect texture ratings for each of the multiple respective proposed coating matches, wherein:
         the effect texture ratings indicate differences in effect textures between a target coating effect texture and effect textures associated with each of the multiple respective proposed coating matches, each effect texture ratings is derived from a statistical mapping of the coating texture variables to human-perceived rankings of relative effect texture differences between a set of coatings that does not include the target coating between the one or more coating texture variables of the target coating, and the effect texture rating is displayed using a visual depiction of a slider bar, wherein a location of the slider in the slider bar indicates a relative texture difference between the target coating and at least one proposed coating matches;

color coating ratings for each of the multiple respective proposed coating matches, wherein:

the color coating ratings indicate differences in coating colors between a target coating color and colors associated with each of the multiple respective proposed coating matches, and each color coating ratings is derived from a statistical mapping of the coating texture variables to human-perceived rankings of relative coating color differences between a set of coatings that does not include the target coating, and sparkle color ratings for each of the multiple respective proposed coating matches, wherein:

the sparkle color ratings indicate differences in sparkle colors between a target coating sparkle colors and sparkle colors associated with each of the multiple respective proposed coating matches, and each sparkle color ratings is derived from a statistical mapping of the coating texture variables to human-perceived rankings of relative sparkle color differences between a set of coatings that does not include the target coating; and order the proposed coating matches, wherein the ordering indicates a strength in similarity between the target coating and each of the proposed coating matches with respect to the effect texture ratings, color coating ratings, or sparkle color ratings.

2. The system as recited in claim 1, wherein:
the sparkle color ratings comprise a standard, universal comparison metric for comparing coatings.

3. The system as recited in claim 2, wherein:
the color coating ratings comprises a standard, universal comparison metric for comparing coatings.

4. The system as recited in claim 3, wherein the executable instructions include instructions that are executable to configure the computer system to:
receive a preferred rating from a user input, wherein the preferred rating is effect texture, coating sparkle color, or coating color.

5. The system as recited in claim 3, wherein the executable instructions include instructions that are executable to configure the computer system to:
receive from one or more rating thresholds from a user input, wherein the one or more rating thresholds define user-defined acceptable thresholds relating to effect texture, coating sparkle color, or coating color; and
wherein the ordering accounts for the one or more rating thresholds.

6. The system as recited in claim 1, wherein the executable instructions include instructions that are executable to configure the computer system to:

receive from the coating-measurement instrument one or more coating color travel variables of the target coating;

display, on the digital display device, coating color travel ratings for each proposed coating match, wherein the coating color travel ratings indicate a similarity between the one or more coating color travel variables of the target coating and respective coating color travel variables of each proposed coating match; and wherein the ordering also indicates strength in similarity between the target coating and each proposed coating match with respect to the coating color travel ratings.

7. The system as recited in claim 6, wherein displaying the coating color travel ratings for each proposed coating match comprises displaying a visual indication indicating a difference in face or flop color.

8. The system as recited in claim 1, wherein displaying the effect texture ratings comprises displaying a visual indication indicating whether each proposed coating match is more coarse or more fine than the target coating.

9. The system as recited in claim 1, wherein displaying the effect texture ratings comprises displaying an effect texture visual indication indicating whether each proposed coating match comprises more or less texture than the target coating.

10. A computerized method for execution on a computer system comprising a display device, one or more processors, system memory, the method for displaying values that describe various attributes of one or more proposed, matching colors, the method comprising:

receiving from a coating-measurement instrument a plurality of coating variables of a target coating;

receiving data for multiple respective proposed coating matches with the target coating, wherein the data comprise color data, texture data, and one or more sparkle color ratings, wherein the multiple respective proposed coating matches are matched based at least in part on a match of sparkle color variables with the target coating;

displaying in a user interface the received sparkle color ratings of each proposed coating match, wherein:

the sparkle color ratings indicate differences in sparkle colors between a target coating sparkle colors and sparkle colors associated with each of the multiple respective proposed coating matches, and each sparkle color ratings is derived from a statistical mapping of the coating texture variables to human-perceived rankings of relative sparkle color differences between a set of coatings that does not include the target coating;

displaying a visual depiction of a slider bar, wherein the slider bar indicates a relative texture difference between a target coating and one or more proposed coating matches; and displaying an overall ranking of each proposed coating match, wherein the overall ranking indicates a similarity of sparkle color ratings with the target coating and each proposed coating match.

11. The method of claim 10, wherein:
the received texture data comprise effect texture ratings for each proposed coating match, the effect texture ratings indicating a similarity between one or more coating texture variables of the target coating and respective coating textures variables of each proposed coating match; and
the overall ranking also indicates a similarity of effect texture ratings with the target coating and each proposed coating match.

12. The method of claim 11, wherein:
the received color data comprise coating color ratings for each proposed coating match, the coating color ratings indicating a similarity between the one or more coating color variables of the target coating and respective coating color variables of each proposed coating match; and
the overall ranking also indicates a similarity of coating color ratings with the target coating and each proposed coating match.

13. The method of claim 12, further comprising:
receiving data corresponding to a user's preferred rating, wherein the preferred rating is effect texture, sparkle color, or coating color; and
wherein the overall ranking also indicates the preferred rating.

14. The method of claim 12, further comprising:
receiving data corresponding to one or more rating thresholds, wherein the one or more rating thresholds define user-defined acceptable thresholds relating to effect texture, coating sparkle color, or coating color; and
wherein the overall ranking accounts for the one or more rating thresholds.

15. The method of claim 11, wherein the effect texture ratings for each proposed coating match further indicate whether each proposed coating match is more coarse or more fine than the target coating.

16. The method of claim 11, wherein the effect texture ratings indicate for each proposed coating match indicate whether each proposed coating match has more or less texture than the target coating.

17. The method of claim 10, further comprising:
receiving data corresponding to coating color travel ratings for each proposed coating match, wherein the coating color travel ratings indicate a similarity between the one or more coating color travel variables of the target coating and respective coating color travel variables of each proposed coating match; and
wherein the overall rankings also indicate a similarity of the coating color travel ratings with the target coating and each proposed coating match.

18. The method of claim 10, wherein the displayed overall ranking based on sparkle color ratings also indicates a sparkle color ratio of a first colored texture sparkle to a second colored texture sparkle within the target coating.

19. A computer program product comprising one or more non-transitory computer storage media having stored thereon computer-executable instructions that, when executed at a processor, cause the computer system to perform a method for displaying matches of a paint sample to various proposed paint coatings, the method comprising:
receiving one or more coating texture variables of a target coating from a coating-measurement instrument;
displaying for multiple respective proposed coating matches on a digital display device, at least the following separate ratings:
effect texture ratings for each of the multiple respective proposed coating matches, wherein:
the effect texture ratings indicate differences in effect textures between a target coating effect texture and effect textures associated with each of the multiple respective proposed coating matches, and
each effect texture ratings is derived from a statistical mapping of the coating texture variables to human-perceived rankings of relative effect texture differences between a set of coatings that does not include the target coating, and
the effect texture rating is displayed using a visual depiction of a slider bar, wherein a location of the slider in the slider bar indicates a relative texture difference between the target coating and at least one proposed coating matches;
color coating ratings for each of the multiple respective proposed coating matches, wherein:
the color coating ratings indicate differences in coating colors between a target coating color and colors associated with each of the multiple respective proposed coating matches, and
each color coating ratings is derived from a statistical mapping of the coating texture variables to human-perceived rankings of relative coating color differences between a set of coatings that does not include the target coating; and
sparkle color ratings for each of the multiple respective proposed coating matches, wherein:
the sparkle color ratings indicate differences in sparkle colors between a target coating sparkle colors and sparkle colors associated with each of the multiple respective proposed coating matches, and
each sparkle color ratings is derived from a statistical mapping of the coating texture variables to human-perceived rankings of relative sparkle color differences between a set of coatings that does not include the target coating; and
ordering the proposed coating matches, wherein the ordering indicates a strength in similarity between the target coating and each of the proposed coating matches with respect to the effect texture ratings.

20. A computerized method for execution in a computing system, the computerized system comprising a memory; at least one processor; and a storage device, the method for displaying on a display device a graphical user interface that matches a target coating to another coating based on raw spectrophotometer data relevant to coating texture, the method comprising:
displaying an icon on a graphical user interface that indicates a color of a target coating, wherein the icon is selected by the computing system in response to raw spectrophotometric data taken for a target coating applied to a target object;
displaying a number indicating an amount of potential matches of the target coating to predetermined coating information stored in a database, wherein the matches are based on a correlation of texture variables from the target coating and human-provided impression data; and
for each potential match displayed on the graphical user interface:
displaying an icon that visually represents the potential match;
displaying a visual depiction of a slider bar, wherein the slider bar indicates a relative texture difference between the target coating and the potential match;
displaying at least one field that visually indicates a manufacturer associated with the target coating;
displaying at least one field that visually indicates a color value for the potential match; and
displaying at least one field that visually indicates a texture value for the potential match, wherein:
the texture value indicates a difference in texture between a target coating and each potential match, and each texture value is derived from a statistical mapping of coating texture variables to human-perceived rankings of texture value differences between a set of coatings that does not include the target coating.

* * * * *